United States Patent
Ellis

(10) Patent No.: US 10,053,648 B2
(45) Date of Patent: Aug. 21, 2018

(54) CONTINUOUS-FLOW EXTRACTION SYSTEM AND METHOD

(71) Applicant: Matthew Ellis, Littleton, CO (US)

(72) Inventor: Matthew Ellis, Littleton, CO (US)

(*) Notice: Subject to any disclaimer, the term of this patent is extended or adjusted under 35 U.S.C. 154(b) by 0 days.

(21) Appl. No.: 15/591,598

(22) Filed: May 10, 2017

(65) Prior Publication Data
US 2017/0240841 A1 Aug. 24, 2017

Related U.S. Application Data

(63) Continuation-in-part of application No. 15/190,977, filed on Jun. 23, 2016, now Pat. No. 9,687,754, which is a continuation-in-part of application No. 14/470,494, filed on Aug. 27, 2014, now Pat. No. 9,399,180, which is a continuation-in-part of application No. 13/734,915, filed on Jan. 4, 2013.

(51) Int. Cl.
*C11B 1/10* (2006.01)
*B01D 11/00* (2006.01)

(52) U.S. Cl.
CPC ............... *C11B 1/10* (2013.01); *B01D 11/00* (2013.01)

(58) Field of Classification Search
CPC ............ B01D 11/0203; B01D 11/0207; B01D 11/028; B01D 11/0292; B01D 11/00; B01D 2011/007; C11B 1/10
See application file for complete search history.

(56) References Cited

U.S. PATENT DOCUMENTS

| | | |
|---|---|---|
| 5,516,923 A | 5/1996 | Hebert et al. |
| 7,002,029 B2 | 2/2006 | Davis |
| 9,399,180 B2 | 7/2016 | Ellis |
| 9,687,754 B2 * | 6/2017 | Ellis .................. B01D 11/0207 |
| 2003/0077367 A1 | 4/2003 | Trout |
| 2009/0028971 A1 | 1/2009 | Wiesmuller et al. |
| 2011/0100894 A1 | 5/2011 | Miller |
| 2011/0133120 A1 | 6/2011 | McGhee |
| 2016/0091226 A1 * | 3/2016 | Buese ................ B01D 11/0219 62/115 |

* cited by examiner

*Primary Examiner* — Lyle Alexander
*Assistant Examiner* — Bryan Kilpatrick
(74) *Attorney, Agent, or Firm* — Keaty Law Firm, LLC

(57) ABSTRACT

A continuous-flow extraction system and method for extracting oil from oil-bearing plant parts, or biomass, with liquid-phase hydrocarbon solvent in a continuous process, providing more than one extraction vessel so that one or more extraction vessels can be cleared of exhausted biomass and reloaded with biomass, while another one or more extraction vessels are undergoing the extraction process, optionally providing a de-waxer for use when needed, providing a primary jacketed separator vessel for flashing hydrocarbon solvent to a vapor phase and precipitating and collecting liquid plant extract, providing at least one secondary jacketed separator vessel for purification and refinement of vapor-phase hydrocarbon solvent and providing for re-liquefication of the solvent for the purpose of re-circulating and reusing the solvent, and providing for the heating, cooling, and pumping necessary to carry out the various steps.

25 Claims, 14 Drawing Sheets

CONTINUOUS-FLOW EXTRACTION SYSTEM AND METHOD

CROSS-REFERENCE TO RELATED APPLICATIONS

This application is a continuation-in-part of my co-pending application Ser. No. 15/190,977, filed on Jun. 23, 2016 for an "Apparatus for Extracting Oil from Oil-Bearing Plants," now U.S. Pat. No. 9,687,754, issued on Jun. 27, 2017, which is a continuation-in-part of my previous application Ser. No. 14/470,494, filed on Aug. 27, 2014 for an "Apparatus for Extracting Oil from Oil-Bearing Plant Material," issued as U.S. Pat. No. 9,399,180 on Jul. 26, 2016, which is a continuation-in-part of my previous application Ser. No. 13/734,915, filed on Jan. 4, 2013 (now abandoned), the full disclosures of which are hereby incorporated by reference and priority of which are hereby claimed.

BACKGROUND OF THE INVENTION

This invention is a continuous-flow extraction system and method for extracting oil from oil-bearing plant parts, or biomass, with liquid-phase hydrocarbon solvent, in a continuous process, with re-circulation and reuse of the solvent.

Presently, such extraction is performed on a batch basis, in part because there is a need to empty and clear the extractor vessel of spent and exhausted biomass, and to reload the vessel with fresh biomass. These processes in turn require a temporary shutdown of the extraction process. Additionally, present systems and methods do not provide for continuous regeneration of the used hydrocarbon solvent's properties, such that a smaller total amount of solvent can be used in an essentially closed, continuous loop.

Plant oils have been extracted from plant material for centuries. Many plant oils are extracted from seeds by squeezing or crushing the seeds to force out the oil therefrom. Mechanical oil extractors or expellers are extensively used for obtaining cold-pressed oils where the temperature of starting material does not exceed 120-degrees Fahrenheit. In order to increase the oil output, the oil extraction methods provide for the addition of heat and pressure.

In addition, plant oils can be extracted with the assistance of a chemical agent or solvent, such as hexane. Chemical extraction is cheaper and more efficient than mechanical extraction, at a large scale, leaving only 0.5-0.7% of the oil in plant solids, as compared to the 6-14% of mechanical extraction.

Plant seeds and pods are not the only plant components that contain oil. Fibrous plant matter, including leaves, flowers, and so forth, contain significant amounts of plant oil that can be extracted and used in cosmetics, healthcare industries, and the like. Many solutions have been developed to provide plant oil extraction.

For instance, U.S. Pat. No. 5,516,923 discloses a method of plant oil extraction, according to which grounded plant material is deposited into a reactor vessel, and vacuum is created in the reactor vessel. Liquid solvent is introduced into the reactor vessel and allowed to contact the plant material for a time sufficient to dissolve oil from the plant material, while the temperature in the reactor vessel is maintained at a level which prevents denaturing of constituent components of the plant oil and the plant material. Additional solvent vapors are introduced into the bottom of the reactor to cause mixing of the plant material and the solvent and separate fine particulate matter from heavier particles. Pressurized heated solvent vapors are introduced into the top of the reactor vessel while the liquid solvent and oil combination is being removed from the bottom of the reactor vessel through filters. To prevent clogging of filters in the bottom of the reactor vessel, pressurized solvent vapors are forced through the filters into the bottom of the reactor vessel. The solvent and oil combination is transferred into a separator vessel, wherein the solvent is vaporized and removed for recycling, while the oil is removed into a holding tank.

U.S. Pat. No. 7,002,029 discloses a process for solvent extraction of oils, in an extraction chamber. According to this method, solvent mist with significant adiabatic cooling is introduced into the extraction chamber, whereby a pressure difference between the solvent inlet and outlet of the extraction chamber drives the solvent mist through the raw oil material. The solvent is fed to the extraction chamber at pressures exceeding the atmospheric pressure, and the outlet of the extraction chamber is subject to a partial vacuum.

U.S. Application Publication No. 2003/0077367 discloses a process and system for extracting a solute from oil-bearing foodstuffs. This design uses a tubular membrane filter to separate a mass of the extracting medium and the foodstuffs into a miscella and foodstuffs of reduced oil content. In a batch or continuous process, after each extracting stage, the mass from the extraction vessel is conveyed to a membrane filter, which has pores along its cylindrical walls suitably sized to allow a miscella to pass as the permeate, while causing the foodstuffs of reduced oil content to be conveyed axially along the tubes and out of its ends as the retentate. This apparatus uses a heating jacket to provide heat by steam, either directly or indirectly. However, the heating jacket of this publication does not supply heat and cold to the interior of the separator vessel and the expansion filter and help evaporate and condense the solvent.

U.S. Application Publication No. 2009/0028971 discloses a method utilizing compressed hydrocarbons. Residues from the crop and fruit treatment, especially from the treatment of pips and berries, are used as starting materials. The method is carried out without organic solvents, while applying low pressures and reduced extraction agent throughputs. Preferred extraction agents are ethane, propane, butane, and the mixtures thereof, with the extraction itself being carried out in batches at pressures of less than 50 mPa and temperatures of approximately 70-degrees Celsius, with an extraction agent throughput of between 4 and 20 kg/kg of starting materials.

U.S. Application Publication No. 2011/0133120 teaches a method of plant oil extraction, which provides for a hermetically first tank coupled to a first valve, the first tank for storing a solvent comprising butane, an extraction zone comprising an extraction chamber coupled between the first valve and a second valve, the extraction chamber having a filter proximate to the second valve; the extraction chamber having a volume between one-fourth and one-sixth of the volume of the first tank. A filter separates flowing butane solvent and plant oil from organic plant material in the extraction chamber. A second tank has an exit valve for removing plant oil located on a bottom portion of the second tank, and an exit valve located near a top portion of the second tank. However, this design provides for the use of filter only at the bottom of the extraction zone.

U.S. Application Publication No. 2011/0100894 teaches a plant oil extraction device that has a main body member with a hollow interior that receives a plant. A filter member is removably mounted on the main body and has a groove therein that receives glass frit. Thus, when a solvent is placed in the hollow interior with the plant, the glass frit filters the plant particulate, allowing plant oil and solvent to flow into a receiving vessel. Once the oil is collected, the filter member may be removed from the main body such that the glass frit can be cleaned of all plant particulate and be reused.

A commercially available example of an extraction distillation unit is a Tamisium Extractor manufacture by TmiE of Cleburne, Tex. This extractor utilizes several different single solvents, and sometimes co-solvents, a primary solvent and a carrier solvent; in total three distinct types of extractions.

While the designs discussed above may work satisfactorily in different environments, there is a need for an easy-to-operate inexpensive apparatus for plant oil extraction that can be used in a non-industrial setting by a cosmetics laboratory, small shop, or consumer, without the need to mix solvents during an extraction process. During tests, it was also noted that the extraction process is made more efficient if the liquid material used to extract oil is maintained at a cooler temperature.

SUMMARY OF THE INVENTION

This invention provides a continuous-flow extraction system and method for extracting oil from oil-bearing plant parts, or biomass, with liquid-phase hydrocarbon solvent in a continuous process providing more than one extraction vessel, such that one or more extraction vessels can be cleared of exhausted biomass and reloaded with biomass while another one or more extraction vessels are undergoing the extraction process. Optionally provided are a de-waxer for use when needed; a primary jacketed separator vessel for flashing hydrocarbon solvent to a vapor phase and precipitating and collecting liquid plant extract; at least one secondary jacketed separator vessel for purification and refinement of vapor-phase hydrocarbon solvent and providing for re-liquefaction of the solvent for the purpose of re-circulating and reusing the solvent; the heating, cooling, and pumping necessary to carry out the various steps.

BRIEF DESCRIPTION OF DRAWINGS

Reference will now be made to the drawings, wherein like parts are designated by like numerals, and wherein.

DETAILED DESCRIPTION OF THE INVENTION

Figure 1:
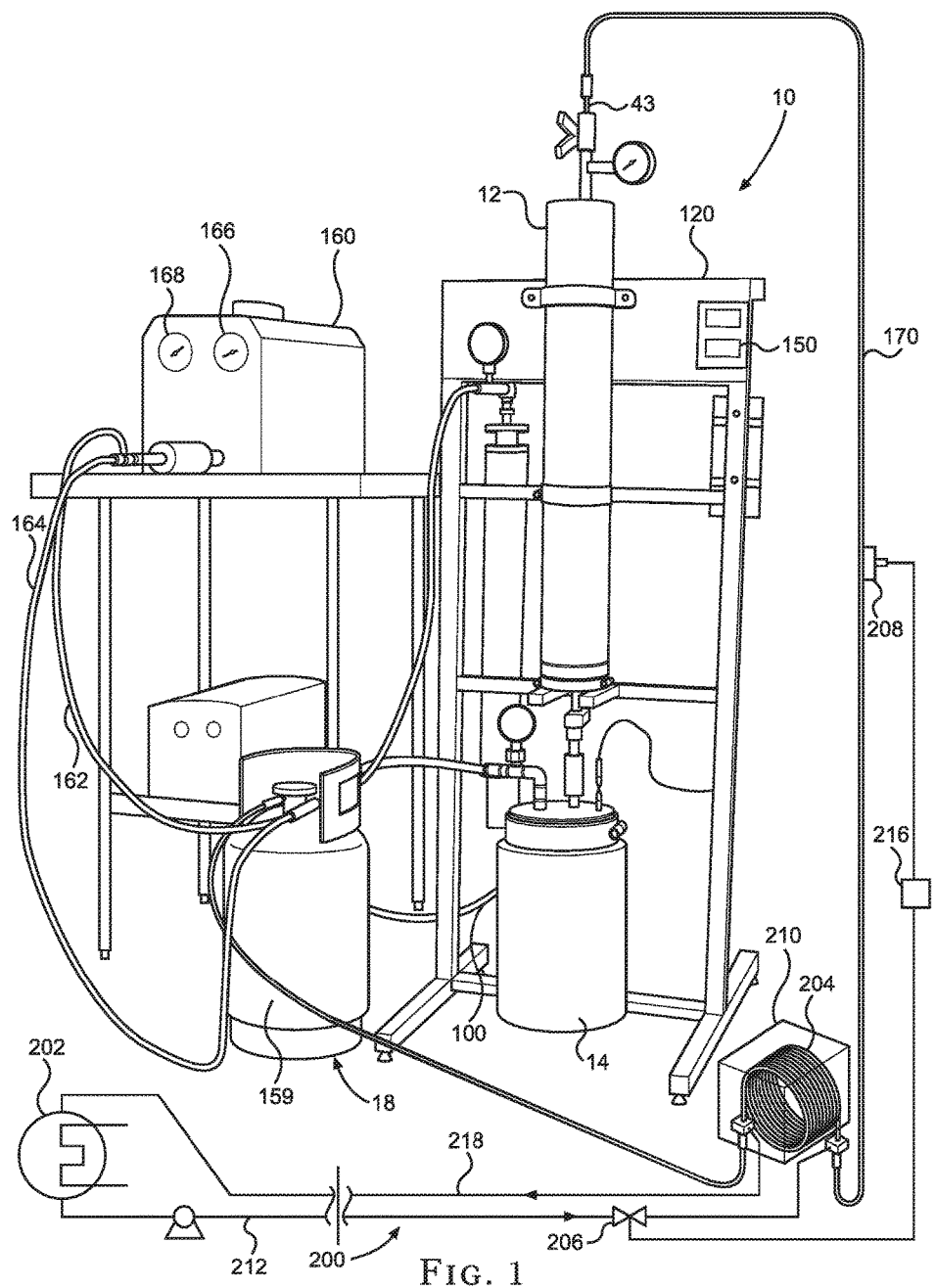
FIG. 1 is a schematic view of the extraction system according to the present invention, showing the operating principles of a batch-processing embodiment of the invention.
Figure 2:
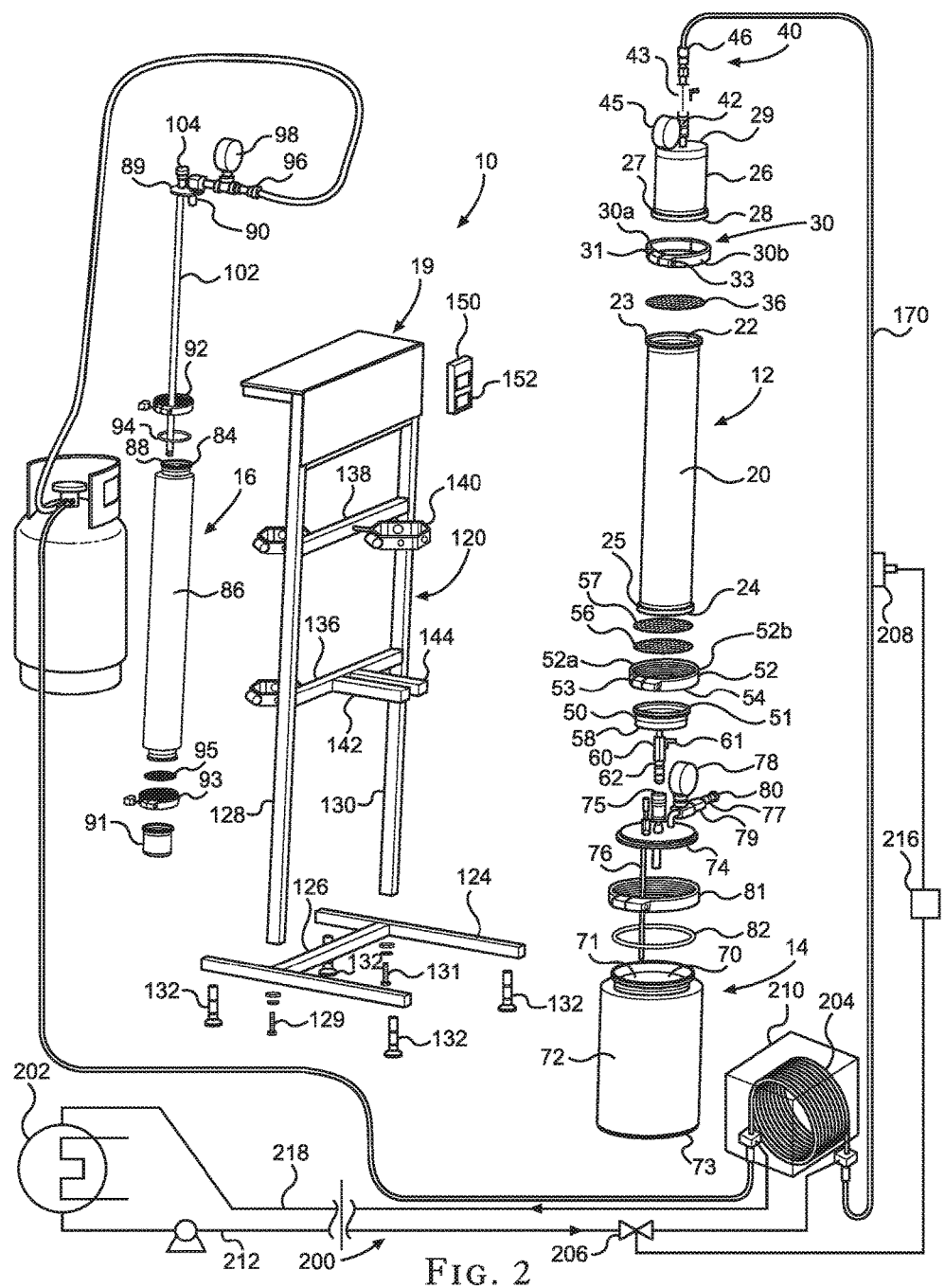
FIG. 2 is an exploded view of the major components of the extraction system according to the present invention, showing the operating principles of a batch-processing embodiment of the invention.

Turning now to the drawings in more detail, numeral 10 designates the system of plant oil extraction according to this invention. The system 10 comprises an extraction assembly 12, a separator assembly 14, an expansion filter assembly 16, a solvent recovery assembly 18, and an upright support assembly 19, which supports the extraction assembly 12 and the expansion filter assembly 16. If desired, the support assembly 19 can also support the separator assembly 14.

The extraction assembly 12 comprises a tubular hollow extraction vessel 20 having an open top 22 and an open bottom 24. A peripheral flange 23 extends outwardly from the open top 22. A similar peripheral flange 25 extends outwardly from the open bottom 24.

A top cup 26 normally detachably engages with the open top 22. The top cup has an open bottom 28 that matches the size and configuration of the top open end 22 of the extraction vessel 20. The top cup 26 is provided with a peripheral flange 27 that matches the top peripheral flange 23 of the extraction vessel 20. A two-piece top clamp member 30 having clamp members 30a and 30b secures the peripheral flanges 23 and 27 with the help of bolt 31 and nut/washer assembly 33.

A perforated gasket 36 is sandwiched between the bottom of the top cup 26 and the top open end 22 of the extraction vessel 20. The perforated gasket 36 allows the gas to atomize before saturating the biomass or plant material in the extraction vessel 20. The gasket 36 also prevents the biomass from moving upwardly into the top cup 26.

The top cup 26 has a closed top plate 29, which carries a connector assembly 40. The connector assembly 40 comprises an operationally connected, an extractor connector conduit 42; a gas inlet valve 43 fitted in the extractor connector conduit 42; and a pressure gauge 45 connected to the gas inlet valve 43. The top of the extractor connector conduit 42 is provided with a quick-connect male connector member 46. The inlet valve 43 can be a ball valve.

A bottom cup 50 is detachably secured to the bottom end 24 of the extraction vessel 20. The bottom cup 50 is provided with a matching peripheral flange 51 extending about an open upper edge of the bottom cup 50. The flange 51 of the bottom cup 50 is securable to the bottom peripheral flange 25 of the extraction vessel 20. A hinge clamp assembly 52 having clamp members 52a and 52b secures the flanges 25 and 51 with the bolt 53 and nut/washer assembly 54. In one aspect of the invention, the top cup 26 has longitudinal dimensions at least slightly greater, and preferably twice as great, as the longitudinal dimensions of the bottom cup 50, which allows for more head space for the gas of the solvent to move into the extraction vessel 20.

A bottom perforated gasket 56 and a fine screen 57 are sandwiched between the bottom cup 50 and the bottom end 24 of the extraction vessel 20 in order to fine filter the extracted oil. In a preferred embodiment, the perforated gaskets 36 and 56 can be made of non-reactive metal, such as stainless steel, and the screen 57 can be a silk screen.

The bottom cup 50 is provided with a bottom plate 58, which closes the bottom of the bottom cup 50. A liquid outlet conduit 60 of the extraction vessel 20 is fitted in the bottom plate 58. An extractor outlet valve 61, which can be a ball valve, is operationally coupled to the liquid outlet conduit 60. A quick-connect connector member 62 is secured to the lower end of the liquid outlet conduit 60.

The separator assembly 14 is mounted below the extraction assembly 20 in fluid communication therewith. The separator assembly 14 comprises a hollow separator or collector vessel 70 enclosed in a separator vessel jacket 72. An annular space is formed between exterior of the separator vessel 70 and interior the separator vessel jacket 72. The annular space can be between 0.5-1.0 inch around the circumference of the separator vessel 70 and the separator vessel jacket. Heated water is circulated in the annular space to heat the separator vessel and speed the conversion of solvent from liquid to gas along the flow line.

The separator vessel has an open top 71 and a closed bottom 73. A separator vessel cap 74 is detachably engageable with the open top 71 of the separator vessel 70. The separator vessel cap 74 sealingly closes the open top 71. The separator vessel cap 74 carries a separator connector conduit 75, which is configured for sealing engagement with the connector member 62 of the bottom cup 50.

A thermal probe member 76 is coupled to the separator vessel cap 74, extending into the interior of the separator vessel 70. A gas outlet conduit 77 is mounted on the separator vessel cap 74 in fluid communication with the separator vessel 70. The gas outlet conduit 77 is provided with a pressure gauge 78 and a gas outlet valve 79. The gas outlet conduit 77 carries a male quick-disconnect member 80. The gas outlet conduit 77 is operationally connected to the solvent recovery assembly 18 via a return line 100.

The separator vessel cap 74 is secured to the separator vessel 70 using a tri-clamp 81, which is similar to the clamps 30 and 52 described above. The clamp 81 ensures tight sealing engagement between the periphery of the separator vessel cap 74 and the separator vessel 70. A resilient gasket 82 is sandwiched between the separator vessel cap 74 and the open top of the separator vessel 70 to further ensure a fluid-tight seal therebetween.

The expansion filter assembly 16 comprises a hollow cylindrical expansion filter vessel 84 enclosed in a filter thermal jacket 86, which similarly to the separator vessel jacket 72, is spaced from the wall of the expansion filter vessel 84 by a distance of 0.5-1.0 inches to allow warm water circulation in the created annular space. An open top 88 of the expansion filter vessel 84 is configured for detachable engagement with a cover plate 89, which carries a filter 90. A tri-clamp 92 secures the cover plate 89 to the open top 88. A flexible gasket 94 ensures a fluid-tight engagement. The filter 90 can be a sintered metal filter. The filter 90 is placed on the outlet side of the expansion filter member to further filter out any impurities or solid material, which may be carried by a flow of gas into a recirculation pump 108, as will be described in more detail hereinafter.

A collection cup 91 is detachably secured to the bottom of the expansion filter vessel 84 with the help of a tri-clamp 93. A perforated filter gasket 95 is fitted between the bottom of the expansion filter vessel 84 and the collection cup 91.

A connector conduit 96 connects the expansion filter vessel 84 with the separator vessel 70. A pressure gauge 98 is provided on the connector conduit 96 for measuring gas pressure in the connector conduit 96. An elongated tube 102 is removably inserted in the expansion filter vessel 84 to allow the gas to travel to the bottom of the expansion filter vessel. A quick-connect fixture 104 is secured on an upper end of the tube 102 for easy connection to gas supply.

A gas booster pump 108 is operationally connected to the connector conduit 96. The gaseous material exiting the expansion filter member 86 is forced to move to the extractor assembly 12 with the assistance of the gas booster pump 108. A gas bottle or gas tank 159 is mounted between the gas booster pump 108 and the extraction assembly 12.

The support assembly 19 comprises an upright stand 120 having a frame-like structure. A pair of base members 122 and 124 is secured in a spaced-apart parallel relationship by a cross bar 126. The base members 122, 124 are designed to rest on a horizontal surface in a work shop, laboratory, or similar space. Upright supports 128 and 130 extend upwardly from the base members 122, 124, respectively, at right angles to the axes of the horizontal base members 122, 124 being secure thereto by bolts 129, 131. A plurality of leveling feet 132 is provided on the bottom of the base members 122, 124 to help maintain the upright support stand 19 on the floor.

Spaced-apart parallel cross members 136, 138 extend between the upright members 128 and 130, further ensuring stability of the support assembly 19. The cross member 138 carries a Y-shaped upper yoke 140, which extends horizontally from the cross member 138 transversely to a longitudinal axis of the cross member 138. The yoke 140 is configured to engage the extraction vessel 20 between the clamps 30 and 52, suspending the extraction vessel 20 on the support stand 120.

A pair of bottom support bars 142, 142 is secured in a spaced-apart parallel relationship to each other and attached to the cross member 136. The bottom support bars 142, 144 extend transversely to a longitudinal axis of the cross member 136. The bottom plate 58 of the bottom cup 50 rests on the bottom support bars 142, 144 when the extraction assembly is mounted on the stand 120. As can be seen in FIG. 1, the extractor assembly 14 is suspended from the bottom support bars 142, 144.

The support assembly 19 also supports a temperature monitor unit 150 for the thermal probe 76 of the separator vessel 20. The temperature monitor unit 138 forms a part of the separator assembly 13. The temperature monitor unit 138 is provided with a temperature indicator 152, which allows visual determination of the thermal conditions inside the separator vessel 70.

The solvent recovery assembly 18 comprises a source of solvent (a gas tank 159) and a gas recovery/control unit 160, as well as associated connected hoses, or lines. On the inlet side, the gas recovery/control unit 160 is connected to the gas return line 162; on the outlet side, to the gas tank 159 via a gas conduit 164. The gas recovery/control unit 160 contains a recovery pump having a pressure indicator 166. A condenser is provided in the gas recovery/control unit for condensing gas evacuated from the separator vessel 70. The condenser has a monitor 168 on the face of the gas recovery/control unit 160.

The gas tank 159 contains a hydrocarbon solvent, such as propane or butane. The gas tank 159 is operationally connected, on the outlet side, to the manually operated gas inlet valve 43 of the extraction assembly 12 via a liquid gas line 170. Liquid gas (such as, for instance, propane) exits the gas tank 159 to act as a solvent for the oil extraction process and re-enters the gas tank 159 as recovered condensed gas.

The temperature of the solvent in the system is regulated by a heat exchanger or computer-based temperature control assembly 200, which regulates delivery and release of the solvent into the extraction assembly 12. The temperature control assembly 200 comprises a cooling device 202 operationally connected to an injector coil member 204, a control valve 206, and a temperature sensor 208 operationally connected to a computer unit 216. The cooling device 202 may be mounted exteriorly to a building, where the apparatus 10 is located if the building is not zoned for hazardous operation. The injection coil member 204 is jacketed in a thermal jacket 210, allowing the user to run the chilled liquid around the outside of a hollow inner tube.

A delivery line 212 runs between the cooling device 202 and the injection coil member 204. The control valve 206 regulates the flow of cooling agent from the cooling device 202 to the injection coil member 204. The gas from the gas tank 159 is cooled when it runs through the injection coil member 204 before entering the liquid gas line 170. The temperature sensor 208 is operationally connected to the computer unit 216, delivering information to the computer unit on the temperature of the solvent entering the extraction vessel 20.

The computer processes the data from the sensor and regulates the operation of the cooling device 202, activating it when necessary to bring the temperature of the solvent to within the desired range of between 25-degrees Fahrenheit and 30-degrees Fahrenheit. As a result, the user can regulate the delivery of the pre-determined temperature hydrocarbon solvent into the extraction vessel 20.

Liquid solvent from the gas tank 159 is drawn through the chilled inner tube of the injection coil member 204 by creating a lower pressure area. The overall temperature of the liquid solvent is lowered, allowing it to be more efficient in the extraction process. The cooling medium is recirculated back to the cooling device 202 via a coolant return line 218 connecting the injection coil member 204 and the cooling device 202.

It is envisioned that the solvent temperature of between 25-degrees Fahrenheit and 30-degrees Fahrenheit is beneficial for optimizing the extraction process in the extraction vessel 20 in many applications. The temperature regulating assembly facilitates recovery of more liquid within a shorter period of time. More oil can be extracted, while lower temperature of the extraction process ultimately saves energy.

Figure 3:
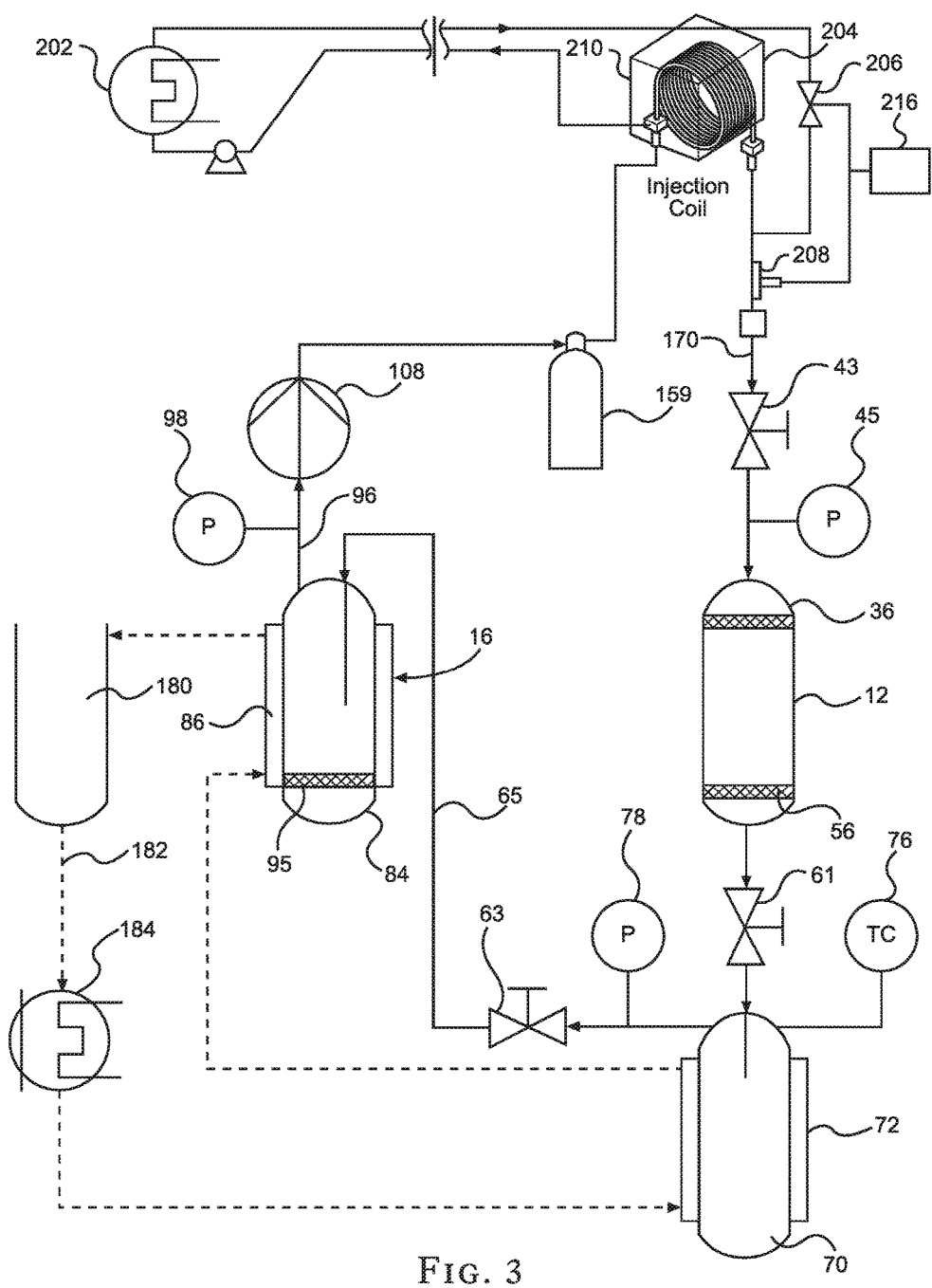
FIG. 3 is a schematic flowchart of the extraction system of the present invention, showing the operating principles of a batch-processing embodiment of the invention.

In FIG. 3, solid lines designate gas lines and phantom lines designate water lines. In operation, the user removes the high-pressure clamp 30 connecting the top cup 26 to the extraction vessel 20. The user then loads the organic plant material into the extraction vessel 20 and reattaches the top cup 26 to the extractor vessel 20 with the high-pressure clamp 30. The user then manually opens the gas inlet valve 43 and extractor outlet valve 61. The user also attaches the vacuum hose 162 to the gas inlet valve 43.

A predetermined amount of water from a water reservoir 180 is delivered via a water hose 182 into a water heater/cooler 184. Heated water is then transferred to the jacket 72 of the separator vessel 70 and to the jacket 86 of the expansion filter vessel 84.

Next, the user turns on the recycling pump inside the gas recovery/control unit 160 and allows the gas recovery/control unit 160 to pull a vacuum on the extractor vessel 20 and the separator vessel 70. Once vacuum has been reached, as evident from monitoring the pressure indicator 166, the valves 43 and 16 are closed. The hose 170 can now be disconnected from the recycling pump and connected to the liquid port on the gas tank 159.

The liquid port on the gas tank 159 is opened, and the gas inlet valve 43 is also slowly opened. This will allow the solvent (such as, for instance, propane) from gas tank 159 to enter the extraction vessel 20. The temperature control assembly 200 regulates the temperature of the solvent entering the extraction vessel 20. Solvent permeates the plant material or biomass that was deposited into the extraction vessel 20, and removes the desired constituents. The soak time and pressure will vary depending on the solvent used. The solvent remains fluid under pressure contained within the extraction vessel 20 between the valves 43 and 61. When the valve 61 is opened, the pressure forces the liquid solvent through the silk screen 57 and the perforated gasket 56 into the separator vessel 70. The pressure gauges should reflect pressure equalizing shortly after the valve 61 is manually opened.

The extract pools at the bottom of the separator vessel 70, and the solvent begins converting into vapor. Applying heat to the water inside the jacket 72 speeds the vaporization process. The valve 63 on the outlet side of the separator assembly 14 is then manually opened, which releases pressurized solvent into the expansion filter via the connecting gas line 65.

The top connector conduit 96 on the expansion filter vessel 84 receives solvent from the separator vessel 70. The vaporized gas descends to the bottom of the expansion filter vessel 84, where it is forced through a molecular sieve 95 before being drawn out by the recovery pump 108. The recovery pump 108 ensures that 99% of the gas is recovered, minimizing exposure to flammable solvents.

Pressure on the outlet side of the expansion filter is monitored by the valve 98. Applying heat to the expansion filter 84 via the filter thermal jacket 86 speeds the process.

The solvent vapor exits the expansion filter vessel 84 and is drawn into the inlet side of the recovery pump via a gas line 67. Before entering the recovery pump 108, the vapor passes through a desiccant filter 95 and spot glass 91 connected to the recovery pump inlet. In the system of the present invention, the expansion filter vessel 84 uses a molecular sieve to filter the vaporized gas solvent. The extraction vessel 20 uses pressure to filter the liquid solvent using a silk filter. The separator vessel 70 converts the liquid solvent to pressurized gas, leaving the extract in liquid form.

The scrubbed solvent vapor is drawn into the recovery pump 108 in pulses and stabilizes in the internal compressor. The solvent is then released from the discharge side of the recovery pump 108 back into the gas tank 159.

The gas recovery/control unit 96 recovers that gas and pumps it back into the gas tank or recovery cylinder 159. The thermal probe 76 in the separator vessel 70 is attached to the thermostat 150, allowing the user to monitor the temperature in the separator vessel 70 during this process. Once all gas has been removed from the separator vessel 70, the user closes the extractor outlet valve 61. The separator vessel 70 is disconnected from the extractor assembly 12 using the quick-disconnect connector below the extractor vessel 20.

Once the separator vessel 70 is detached from the extractor vessel 20, the user can remove the high-pressure clamp that is connecting the separator cap 74 to the separator vessel. The extracted oil can now be removed from the separator vessel. The process can then be repeated by loading a new batch of plant material into the extraction vessel 20, forcing the solvent through the plant material and separating the extracted oil from the plant material.

In one aspect of the invention, both the separator vessel 70 and the extraction vessel 20 hold equal amounts of volume. The volume may be between 5-liters to 10-liters. The separator vessel 70 has a fixed thermal water jacket 90 that allows hot or cold water to be circulated around the separator, when required. In an alternative embodiment, the water heater is replaced with an electric heater. Propane gas can be substituted with other hydrocarbon solvent if desired. A variety of natural organic raw materials can be processed using the apparatus and method of this invention.

The enhanced continuous-flow extraction system and method, the object of this continuation-in-part application, provides for a continuously operated extraction process by providing more than one extraction vessel and providing the ability to dismount, evacuate, refill, and re-mount at least one extraction vessel while at least one other extraction vessel is undergoing the extraction process. In a preferred embodiment, three such extraction vessels are provided. One vessel can be undergoing the extraction process, one vessel can be filled and waiting to be activated next, and one vessel can be dismounted and being cleaned and refilled.

This disclosure of the continuous-flow extraction system and method 300 may start, arbitrarily, with a supply of hydrocarbon solvent, such as propane or butane, under pressure, chilled, and in a liquid phase, for most efficient extraction. This supply corresponds to the gas tank 159 disclosed above.

Figure 4:
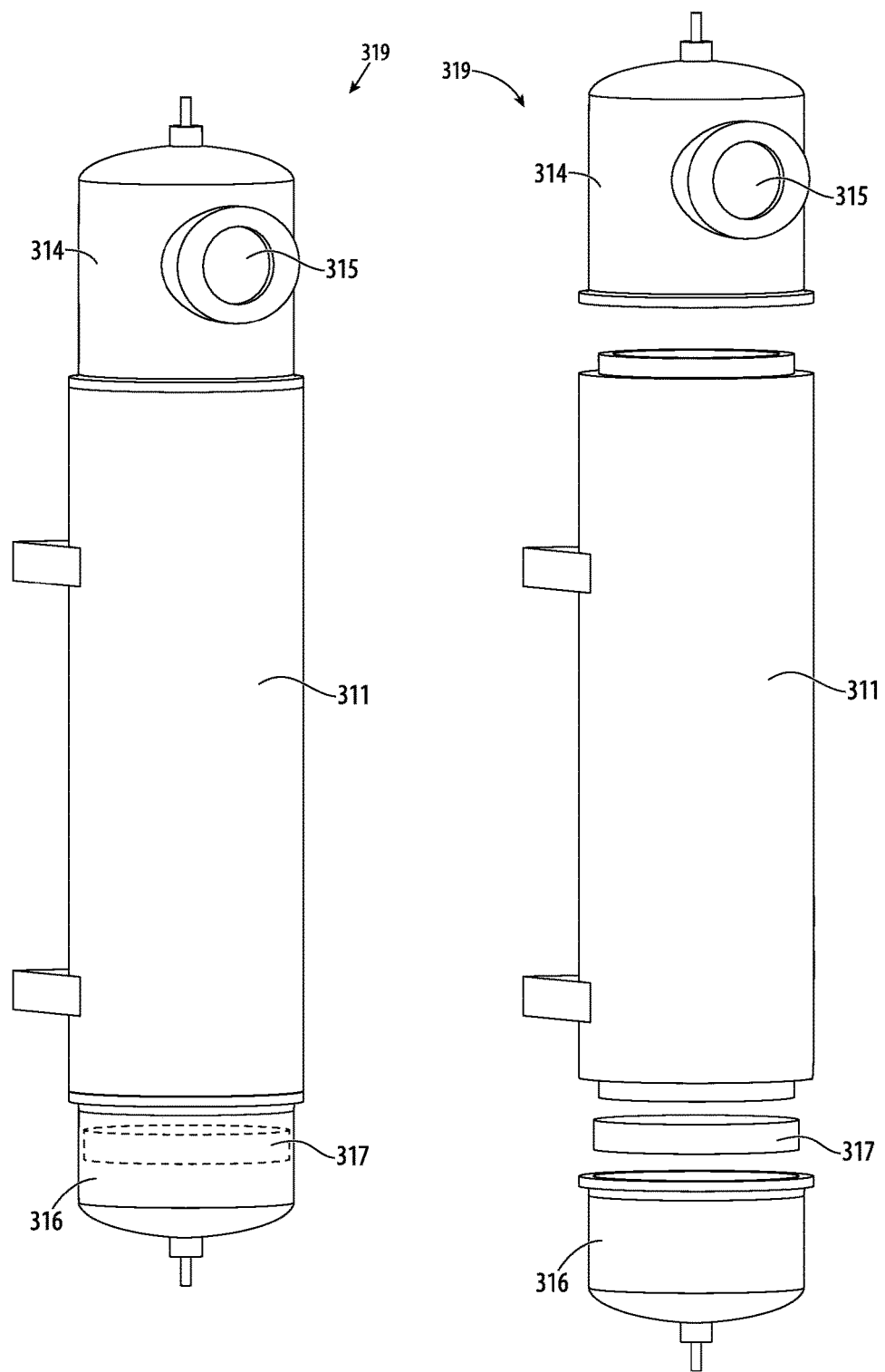
FIG. 4 is an assembled and an exploded view of an extraction vessel according to the continuous-flow extraction system and method embodiment of the invention.

Referring now to FIG. 4, an extraction vessel 319 embodiment of the extraction assembly 12 is shown. The extraction vessel 319 has an extractor body 311 encompassing an extraction assembly 12 chamber, as described above. The top opening of the jacketed extractor body 311 is sealed with an extractor top assembly 314 corresponding to the top cup 26 disclosed above. In a preferred embodiment, this top assembly provides an extractor view port 315, allowing for visual confirmation and evaluation of the liquified hydrocarbon solvent being injected into the extraction vessel 319. An extractor bottom assembly 316 seals the bottom opening of the extractor body 311 and houses an extractor filter unit 317, which in turn incorporates or performs the functions of the bottom perforated gasket 56 and fine screen 57 disclosed above. The extractor filter unit 317 allows the extracted oil and liquified hydrocarbon solvent to pass out the bottom of the bottom assembly while keeping the raffinate, which is the eventually exhausted biomass and any solid residue, inside the extractor body 311.

Figure 5:
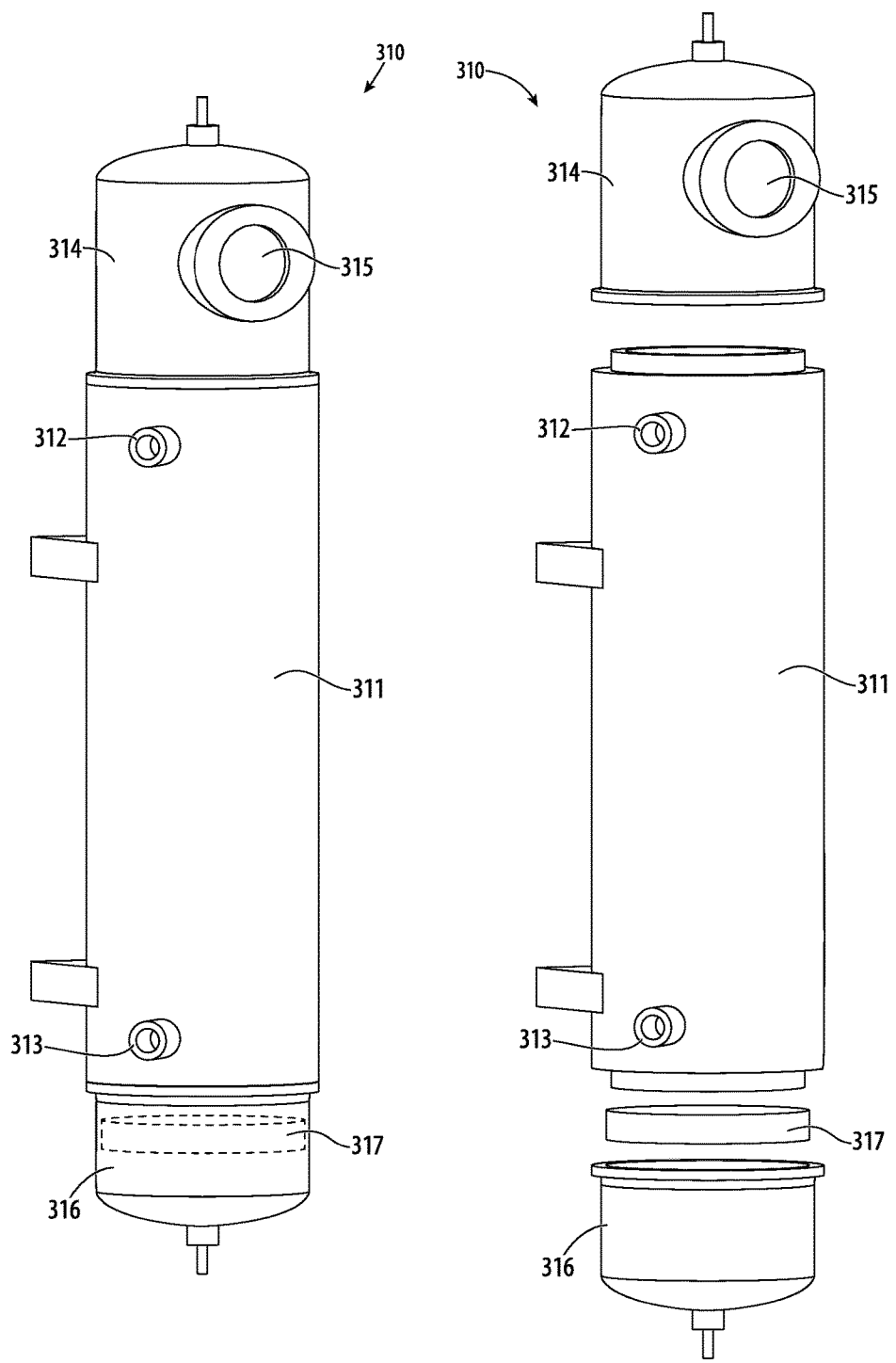
FIG. 5 is an assembled and an exploded view of a jacketed extraction vessel according to the continuous-flow extraction system and method embodiment of the invention.

Referring now to FIG. 5, a jacketed extraction vessel 310 embodiment of the extraction assembly 12 is shown. The jacketed extraction vessel 310 has a jacketed extractor body 311 providing a temperature-modulating-fluid jacket around an extraction assembly 12 chamber, as described above. An extractor jacket upper port 312 and an extractor jacket lower port 313 provide an inlet and an outlet for the connection of lines to and from a temperature-modulating-fluid circulator, such that the temperature-modulating fluid can be circulated through the jacketed extractor body 311 of the jacketed extraction vessel 310. In use, the jacketed extraction vessel 310 will be cooled in order to keep the hydrocarbon solvent in a liquid phase for more efficient extraction. The target temperature will vary with different solvents under different pressures, but will be lower than the boiling point of the pure solvent under the applicable pressure. The top opening of the jacketed extractor body 311 is sealed with an extractor top assembly 314 corresponding to the top cup 26 disclosed above. In a preferred embodiment, this top assembly provides an extractor view port 315, allowing for visual confirmation and evaluation of the liquified hydrocarbon solvent being injected into the jacketed extraction vessel 310. An extractor bottom assembly 316 seals the bottom opening of the jacketed extractor body 311 and houses an extractor filter unit 317, which in turn incorporates or performs the functions of the bottom perforated gasket 56 and fine screen 57 disclosed above. The extractor filter unit 317 allows the extracted oil and liquified hydrocarbon solvent to pass out the bottom of the bottom assembly while keeping the raffinate, which is the eventually exhausted biomass and any solid residue, inside the jacketed extractor body 311.

As disclosed further below, the continuous-flow extraction system and method 300 provides at least two of these extraction vessels 319 or jacketed extraction vessels 310 so that at least one can be undergoing the extraction process while at least one other can be emptied and reloaded with fresh biomass. The extraction vessels 319 and jacketed extraction vessels 310 therefore are designed to be accessible and easy to open and close, either while remaining mounted in place or being unmounted for reloading and re-mounted for extraction.

Figure 6:
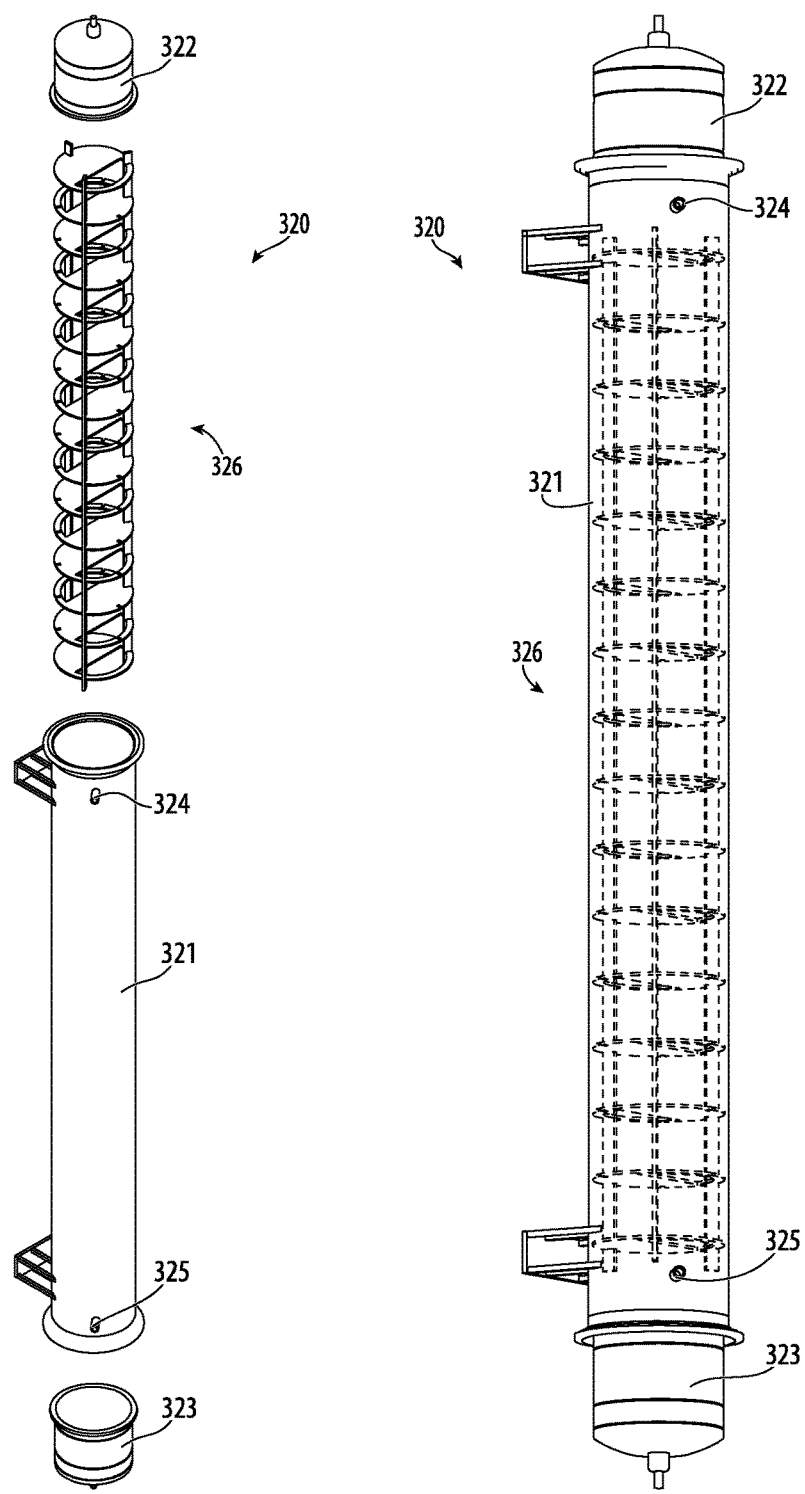
FIG. 6 is an exploded and an assembled view of an embodiment of a jacketed de-waxing vessel according to the continuous-flow extraction system and method embodiment of the invention.

Referring now to FIG. 6, a jacketed de-waxing vessel 320 is provided for the purpose of removing unwanted wax or fats or lipids components of the extract flowing from the extractor bottom assembly 316 of the jacketed extraction vessel 310. The jacketed de-waxing vessel 320 provides a jacketed de-waxer body 321 providing a temperature-modulating-fluid jacket around a central chamber. A de-waxer jacket upper port 324 and a de-waxer jacket lower port 325 provide an inlet and an outlet for the connection of lines to and from a temperature-modulating-fluid circulator, such that temperature-modulating fluid can be circulated through the jacketed de-waxer body 321 of the jacketed de-waxing vessel 320. In use, the jacketed de-waxing vessel 320 will be cooled to a temperature in the range of 5-20 degrees Fahrenheit or −15 to −7 degrees Celsius, inclusive, in order to promote the coagulation of fats and lipids inside the vessel. The jacketed de-waxing vessel 320 provides a de-waxer top assembly 322 and a de-waxer bottom assembly 323 to seal the top and bottom openings of the jacketed de-waxer body 321, and to allow entry of extract into the de-waxer top assembly 322, and exit through the de-waxer bottom assembly 323.

Figures 7, 8:
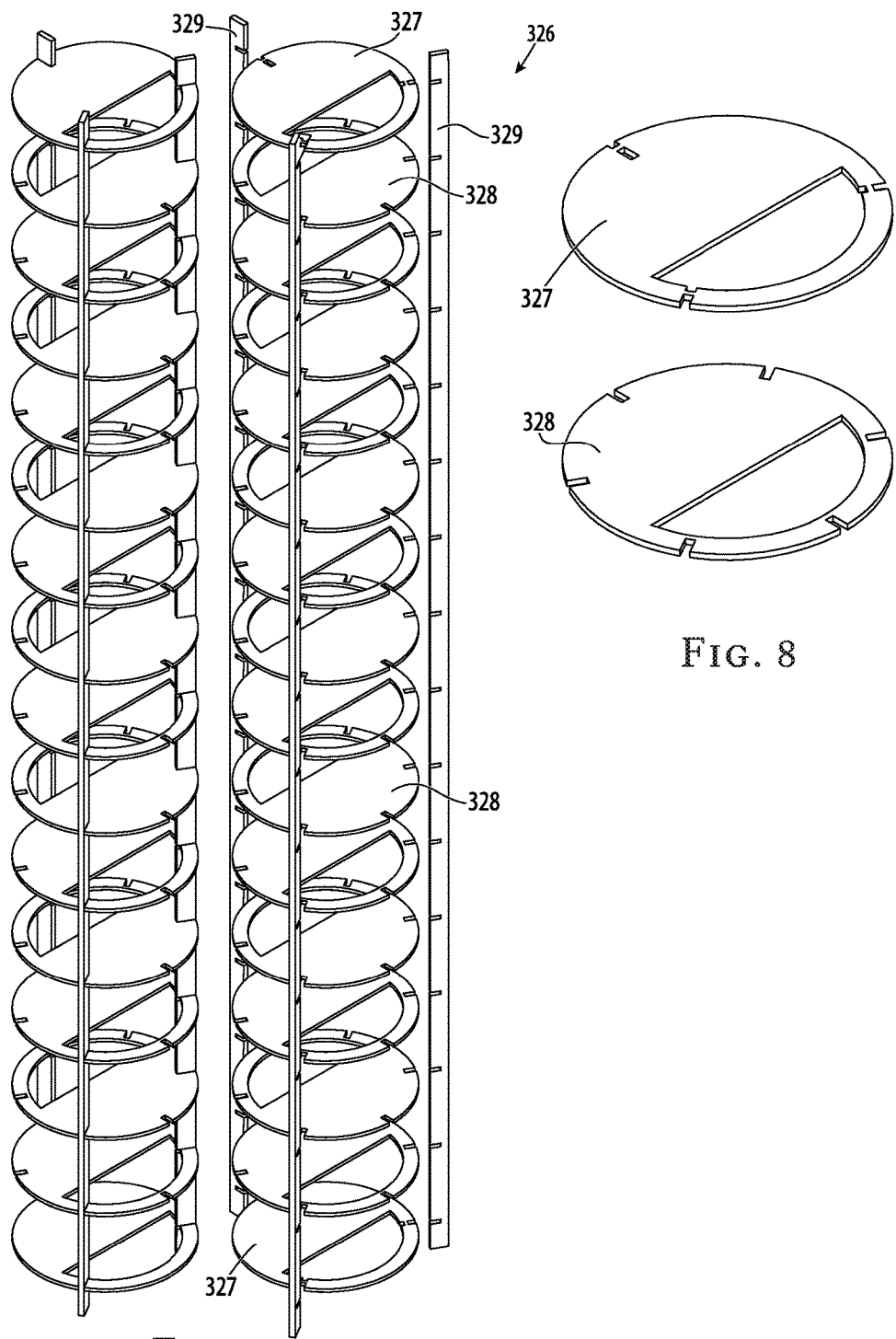
FIG. 7 is an assembled and an exploded view of the de-waxer baffle array of a jacketed de-waxing vessel according to the continuous-flow extraction system and method embodiment of the invention.
FIG. 8 is a perspective view of the metal plate components of the de-waxer baffle array of a jacketed extraction vessel according to the continuous-flow extraction system and method embodiment of the invention.

Referring additionally to FIG. 7 & FIG. 8, an embodiment of the invention provides a de-waxer baffle array 326 inside the jacketed de-waxer body 321. The de-waxer baffle array 326 is made from several metal plates 327, 328, each having a cut-out or opening located toward the outer edge of the plate such that a distinct open side and closed side are defined, as illustrated. The metal plates 327, 328 are arrayed in a stack, with separation between the plates, and are held in position by mounting bars 329, as illustrated. In the stack, the metal plates 327, 328, are arranged such that between any two plates, the open side of one is located opposite the open side of the other, placing the openings in a staggered arrangement such that extract spilling from the open side of an upper plate will make contact with the closed side of a lower plate, ensuring that the extract makes contact with each and all of the plates as it cascades down through the jacketed de-waxing vessel 320. At the proper cool temperatures, fats and lipids will coagulate and become stuck to the baffles. Optionally, additional other known mediums or filters can be packed into the jacketed de-waxing vessel 320 between the metal plate baffles. For example, stainless steel shot or mesh can be added.

Figure 9:
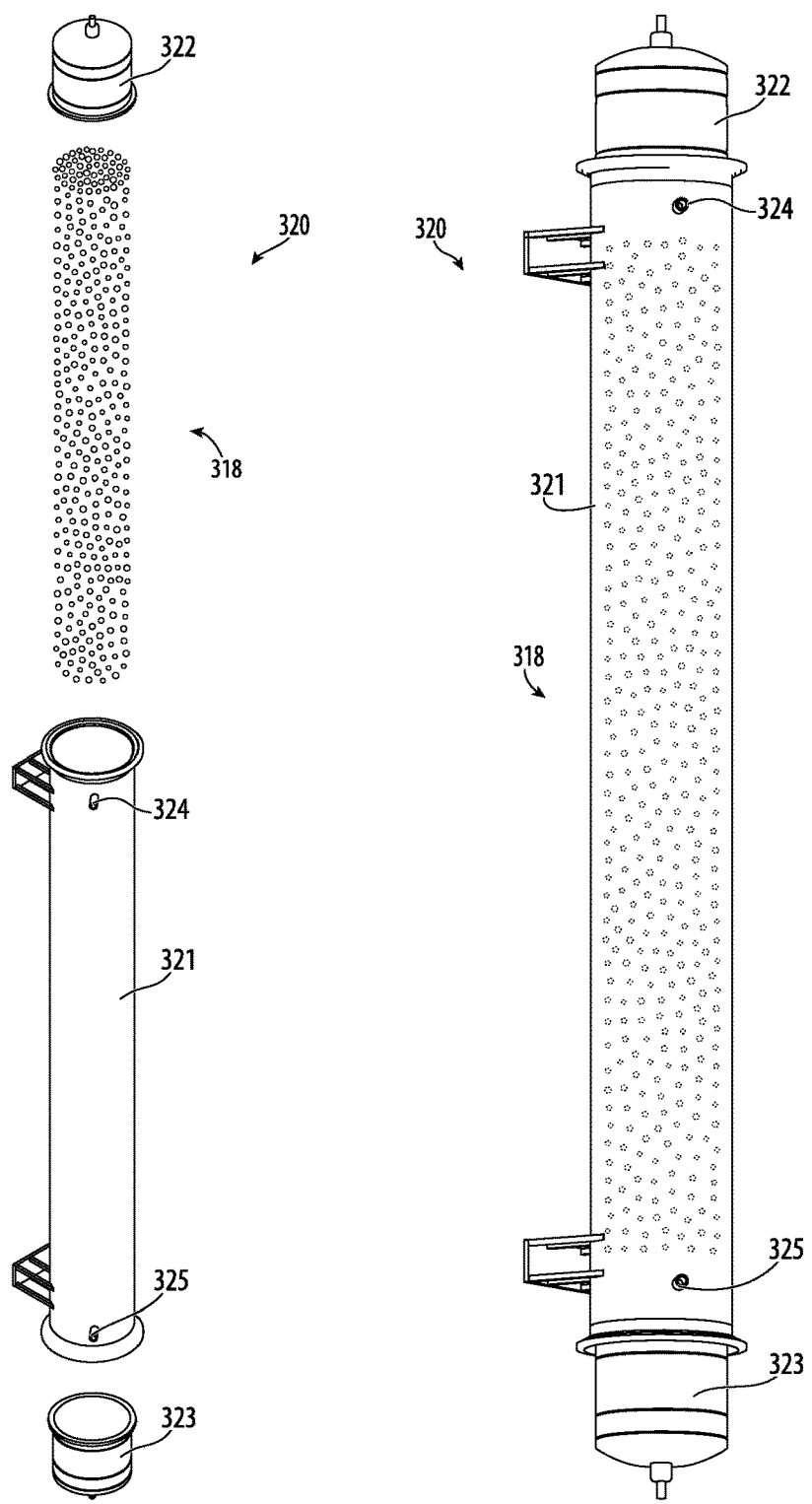
FIG. 9 is an exploded and an assembled view of another embodiment of a jacketed de-waxing vessel according to the continuous-flow extraction system and method embodiment of the invention.

Referring now to FIG. 9, another embodiment of the invention provides stainless-steel diffuser medium 318 inside the jacketed de-waxer body 321.

Figure 10:
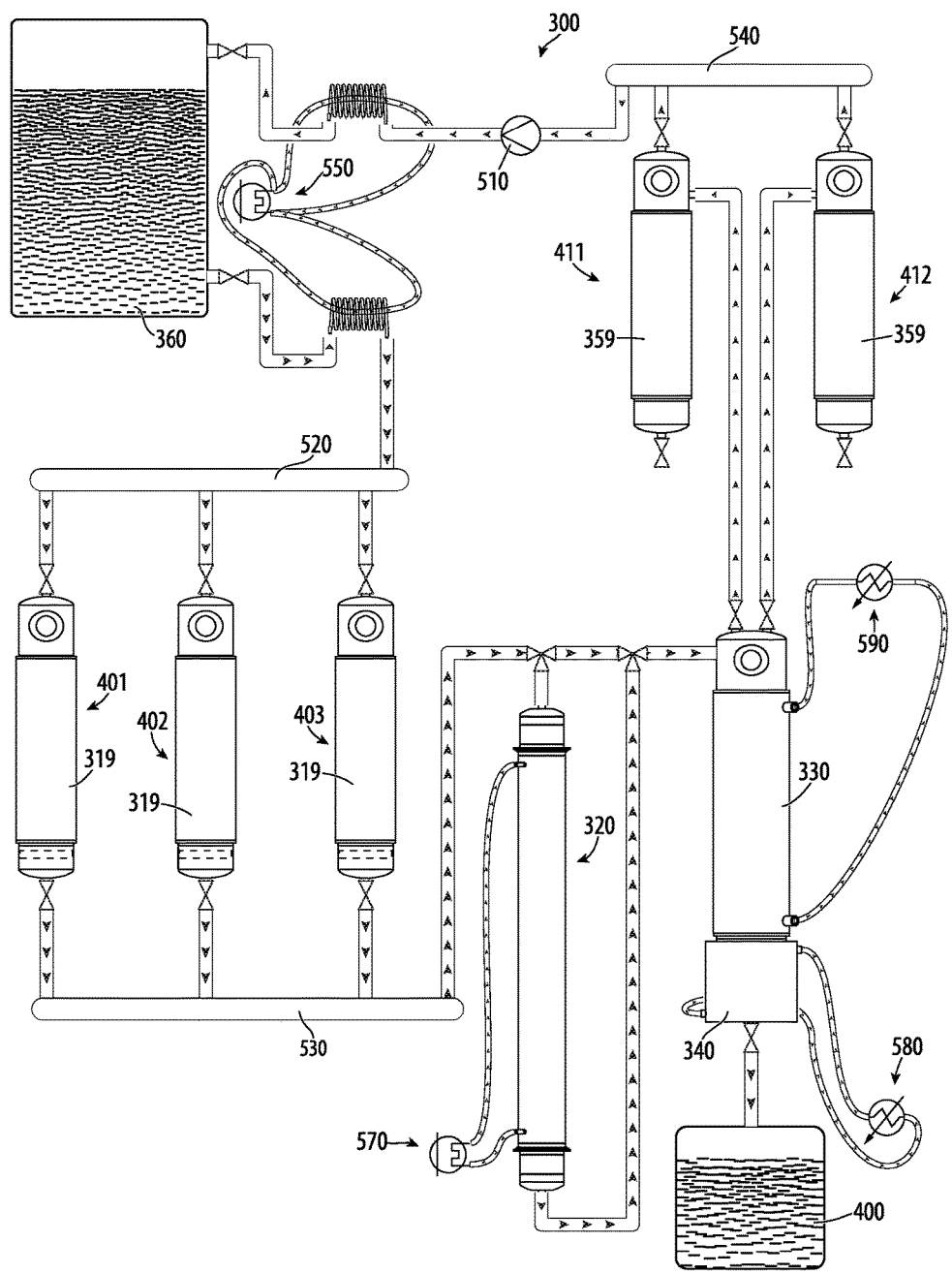
FIG. 10 is a schematic view of an embodiment of the continuous-flow extraction system and method embodiment of the invention.

Referring now to FIG. 10, an embodiment of the continuous-flow extraction system and method 300 provides more than one extraction vessel 319. In the illustrated embodiment, three extraction vessels 401, 402, 403 are provided. Each jacketed extraction vessel 401, 402, 403 is supplied with the liquid-phase hydrocarbon solvent, optionally through a liquid-solvent manifold 520, and expels the raw extract, optionally into a raw-extract manifold 530. The connections of each individual jacketed extraction vessel 401, 402, 403 to the liquid-solvent source and the raw-extract output provide valves that can stop the flow of liquid solvent and raw extract independently, allowing for cleaning, refilling, and dismounting of each vessel individually.

Figure 11:
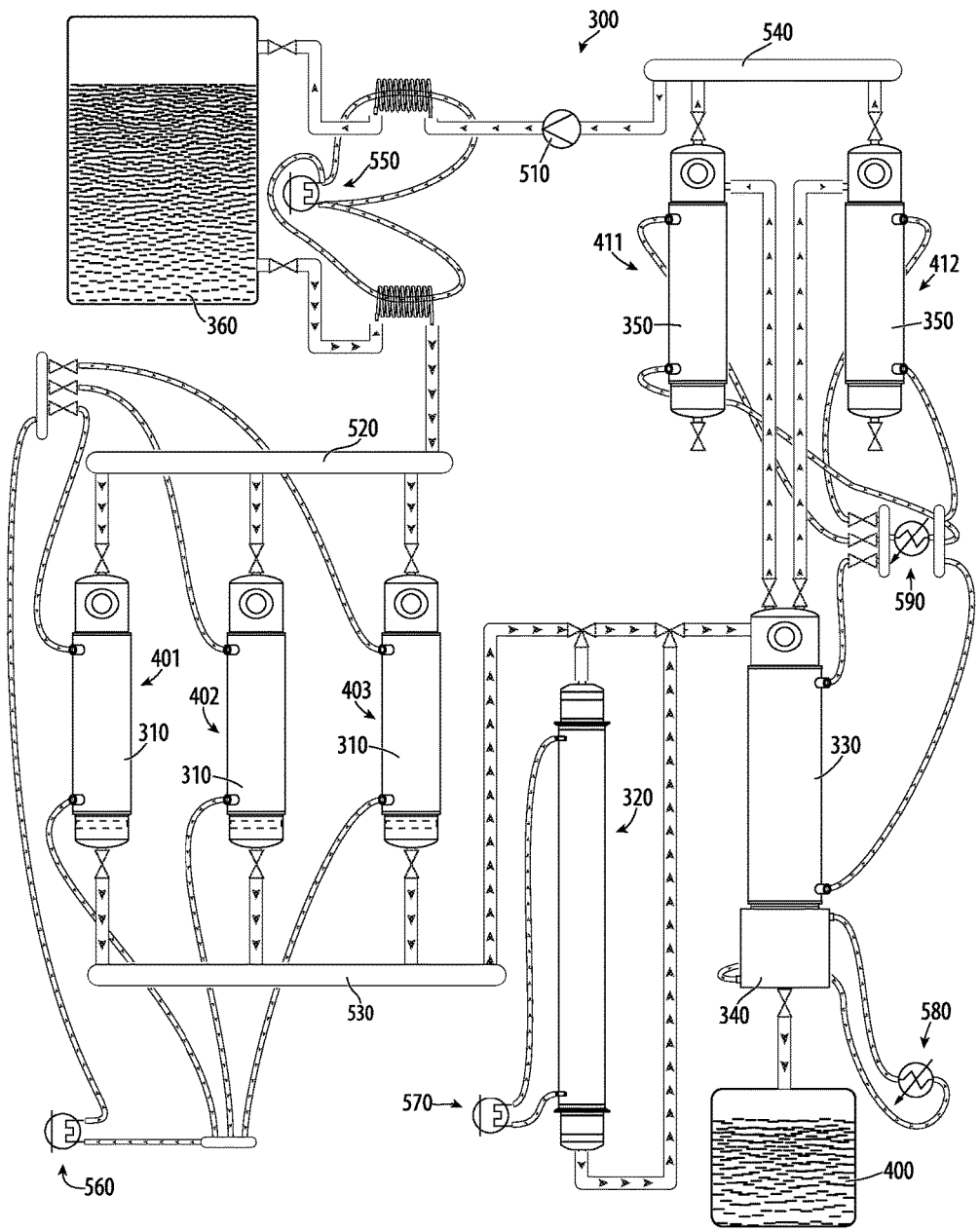
FIG. 11 is a schematic view of another embodiment of the continuous-flow extraction system and method embodiment of the invention.

Referring to FIG. 11, another embodiment of the continuous-flow extraction system and method 300 provides more than one jacketed extraction vessel 310. In the illustrated embodiment, three jacketed extraction vessels 401, 402, 403 are provided. Each jacketed extraction vessel is supplied with chilled cooling fluid circulating through an extraction chiller 560. The cooling fluid is supplied to the jacketed extraction vessels 401, 402, 403 through tubing or piping that provides valves. These valves which can stop the flow to each vessel independently, so that a vessel being opened or removed for cleaning and refilling will not have a flow of cooling fluid during that time. Each jacketed extraction vessel 401, 402, 403 is supplied with the liquid-phase hydrocarbon solvent through a liquid-solvent manifold 520, and expels the raw extract into a raw-extract manifold 530. The connections of each individual jacketed extraction vessel 401, 402, 403 to the liquid-solvent manifold 520 and the raw-extract manifold 530 provide valves that can stop the flow of liquid solvent and raw extract independently, allowing for cleaning, refilling, and dismounting of each vessel individually. In embodiments where the extraction vessels are unmounted and remounted frequently, the couplings to and from the extraction chiller 560, the solvent manifold 520, and the extract manifold 530 should be configured to be quickly, easily, and securely coupled and uncoupled.

Referring now to both FIG. 10 & FIG. 11, which illustrate embodiments without jacketed extractors or jacketed secondary separators, and embodiments with jacketed extractors and jacketed secondary separators, the overall extraction process of the invention is essentially the same whether using unjacketed or jacketed vessels. The invention is described and illustrated here with reference to the more complex, jacketed embodiments, so that all aspects of the invention are disclosed. The description of the jacketed embodiments should be understood to apply to the unjacketed embodiments, with disregard of the jacket-specific language. Similarly, the invention is described and illustrated with reference to manifolds 520, 530, 540 for a clearer presentation of the interconnection and flow of the continuous-flow extraction system and method. However, it is understood in the art that other methods are known for making one-to-many and many-to-one connections, and this invention is meant to encompass all of those known methods.

The liquid-phase hydrocarbon solvent is supplied from a liquid-phase-solvent holding tank 360, which corresponds to the gas tank 159 disclosed above. The liquid-phase solvent is necessarily at a cold temperature and is under some pressure generated by the vapor-pressure pump 510 in another part of the system. Optionally, the liquid-phase solvent exiting the tank can be provided a supplemental cooling by routing through a heat-exchange or cooling segment using cooling fluid circulated through a solvent chiller 550, as illustrated.

In use, liquid-phase hydrocarbon solvent is routed through one or more of the jacketed extraction vessels 401, 402, 403 filled with plant material, or similar biomass from which an extract is to be obtained. The extractor filter unit 317 in the extractor bottom assembly 316 contains the eventually-exhausted biomass or raffinate within the jacketed extraction vessel 310, while allowing a raw extract with still-liquified solvent to exit into the raw-extract manifold 530 and subsequently through the system.

The raw extract obtained from the jacketed extraction vessels 401, 402, 403 and routed through the raw-extract manifold 530 includes the hydrocarbon solvent still in liquid phase, and may contain unwanted components. The raw extract can optionally be routed through the jacketed de-waxing vessel 320. Depending upon the specific biomass being processed, the specific hydrocarbon solvent being used, and the specific end product desired, there may not be a need to send the raw extract through the jacketed de-waxing vessel 320. In such a case, using three-way valves and bypassing the jacketed de-waxing vessel 320 is possible. For many applications, it is likely that de-waxing is desired, and the raw extract from the raw-extract manifold 530 will be routed through the jacketed de-waxing vessel 320. As disclosed above, the jacketed de-waxing vessel 320 is cooled to the desired temperature, with the cooling fluid circulating through a de-waxing chiller 570.

The raw extract, optionally de-waxed, then is routed to a primary jacketed separator vessel 330. This primary jacketed separator vessel performs the combined functions of the separator assembly 14, comprising a hollow separator vessel 70 enclosed in a separator vessel jacket 72, plus some of the functions of the expansion filter vessel 84, as disclosed above. The primary jacketed separator vessel 330 shares essentially the same design as the jacketed extraction vessel 310, with the exception of having a jacketed precipitate collector 340 in place of a bottom assembly. The primary jacketed separator vessel 330 is also likely to be larger, for most applications, than an individual jacketed extraction vessel 310, because the primary jacketed separator vessel 330 accommodates a liquid phase to vapor phase flash transition, accommodates the precipitation of extract, and is heated. The primary jacketed separator vessel 330 can optionally provide a view port, as illustrated, allowing visual confirmation and evaluation of the separation process.

Heat to the primary jacketed separator vessel 330 and to the secondary jacketed separator vessels 350, disclosed below, is provided by heated fluid circulated by a separator heater 590. The target temperature in the separator vessels is related to the flash point of the specific hydrocarbon solvent being used, the amount of negative pressure applied, and any adjustments necessitated by the influence of other components in the raw extract, such as contaminants.

The raw extract entering the primary jacketed separator vessel 330 is at a cool temperature, and the hydrocarbon solvent is in a liquid phase. The primary jacketed separator vessel 330 is heated to a higher temperature by the separator heater 590. Also, a negative pressure is being applied to the primary jacketed separator vessel 330 by the action of the vapor-pressure pump 510 elsewhere downstream in the system, as described below. Upon entering the primary jacketed separator vessel 330, with its raised temperature and lower pressure, the liquified hydrocarbon solvent flashes from a liquid to a vapor and the extract precipitates. The solvent vapor is drawn out of the top, and the extract precipitate falls to the bottom of the primary jacketed separator vessel 330, where it enters a jacketed precipitate collector 340 attached to and serving as a bottom assembly for the primary jacketed separator vessel 330.

The jacketed precipitate collector 340 is independently heated by a precipitate-collector heater 580, so that a different temperature, optimized for the specific compounds in the extract, can be provided. A drain valve in the jacketed precipitate collector 340 provides for the continuous draining of the precipitated extract into a precipitated-extract tank 400, which can accommodate and take off a continuous flow of the precipitated extract. In this continuous-flow extraction system and method 300, the precipitated extract is produced continuously, with no need to interrupt the overall extraction process.

The continuous-flow extraction system and method 300 also reconstitutes, reclaims, and reuses the hydrocarbon solvent. In the primary jacketed separator vessel 330 described above, the liquid-phase solvent flashes to vapor, leaving the extract to precipitate and remain in liquid phase. This now-vaporized solvent might carry some non-precipitated components either extracted from the biomass or formed during the extraction process. These other non-precipitated components are, at this point, contaminants in the hydrocarbon solvent, lowering the solvent's effectiveness in a subsequent extraction cycle. These contaminants are removed by a secondary jacketed separator vessel 350. In a preferred embodiment, as illustrated, there are more than one, and in this case two, secondary jacketed separator vessels 411, 412, which allows one secondary jacketed separator vessel 350 to be taken out of service for cleaning, which might be necessary if, for instance, particularly sticky and stubborn contaminants were encountered. Most contaminants should flow out of the drain valve in the secondary jacketed separator vessel 350, and from there can be properly discarded or, if the contaminant has any independent value, be collected and further processed.

The secondary jacketed separator vessel 350 performs some of the functions of the expansion filter vessel 84, as disclosed above, but performs apart from, and downstream of, the primary jacketed separator vessel 330. The secondary jacketed separator vessel 350 shares essentially the same design as the jacketed extraction vessel 310, but does not necessarily need an extractor filter unit 317, because the separator vessels only ever accommodate vapors and liquids. The secondary jacketed separator vessel 350 has a jacketed body with upper and lower ports, and has a top and a bottom assembly. The top assembly optionally provides a view port, as illustrated, allowing visual confirmation and evaluation of the separation process.

In use, possibly contaminate-bearing vapor-phase hydrocarbon solvent is evacuated from the primary jacketed separator vessel 330 under the negative pressure provided by the vapor-pressure pump 510 further downstream in the system. This vapor is drawn into a secondary jacketed separator vessel 350, which is heated by fluid circulating through the separator heater 590, at an appropriate temperature for the specific conditions, as described above for the primary jacketed separator vessel 330, which also draws heat from the separator heater 590. The secondary jacketed separator vessel 350 further purifies the vapor-phase hydrocarbon solvent, as described for the expansion filter vessel above. The resulting purified vapor-phase solvent then enters a vapor-solvent manifold 540, from which the vapor-phase solvent is drawn by a vapor-pressure pump 510, which in turn pushes the vapor-phase solvent through a heat-exchange or cooling segment using cooling fluid circulated through a solvent chiller 550. The combination of the increased pressure provided by the vapor-pressure pump 510 and the cooling provided by the solvent chiller 550 transforms the hydrocarbon solvent back into a liquid phase. The target is a combined temperature and pressure that brings the specific solvent being used below its vapor-liquid phase change point.

The now-liquid-phase solvent is then routed to a liquid-phase-solvent holding tank 360, which corresponds to the gas tank 159 disclosed above. This solvent has been reconstituted and reclaimed from the previous iteration of the continuous-flow extraction process. At this point, the process has returned to the arbitrary starting point identified above.

Figure 12:
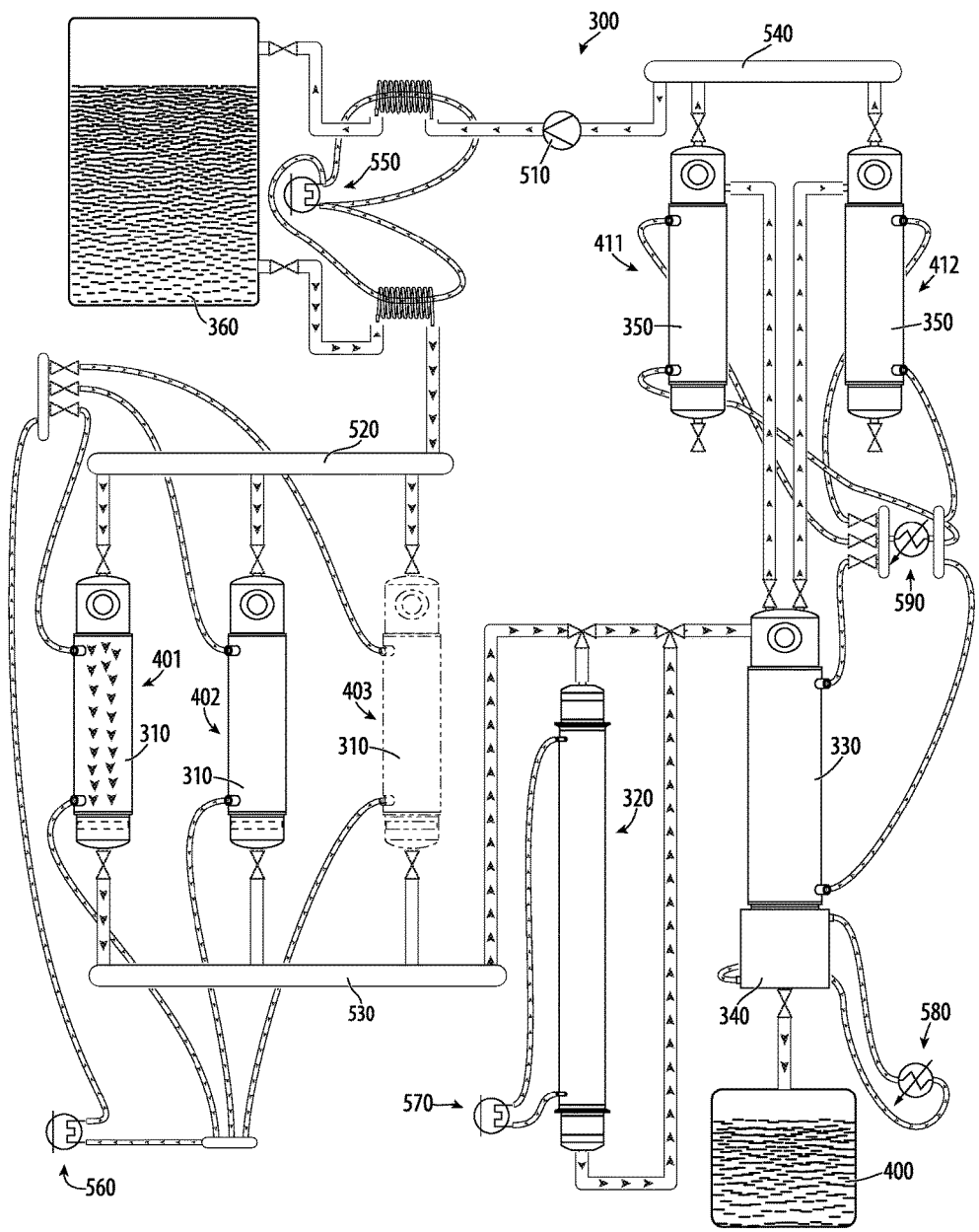
FIG. 12 is a schematic view of a nominal first phase of operation of the continuous-flow extraction system and method embodiment of the invention.

Referring now to FIG. 12, during a nominal first phase of the continuous-flow extraction system and method 300, plant material or biomass contained in a nominal first jacketed extraction vessel 401 undergoes the extraction process, with liquid-phase hydrocarbon solvent passing through the extraction vessel and extracting the desired compound or compounds. A nominal second jacketed extraction vessel 402 has been loaded with fresh biomass, and is ready for the start of the extraction process either before or concurrent with the end of the extraction process in the first jacketed extraction vessel 401. A nominal third jacketed extraction vessel 403 has been removed or has been opened in place for removal of any exhausted biomass, for any necessary cleaning, and for the reloading of fresh biomass.

Figure 13:
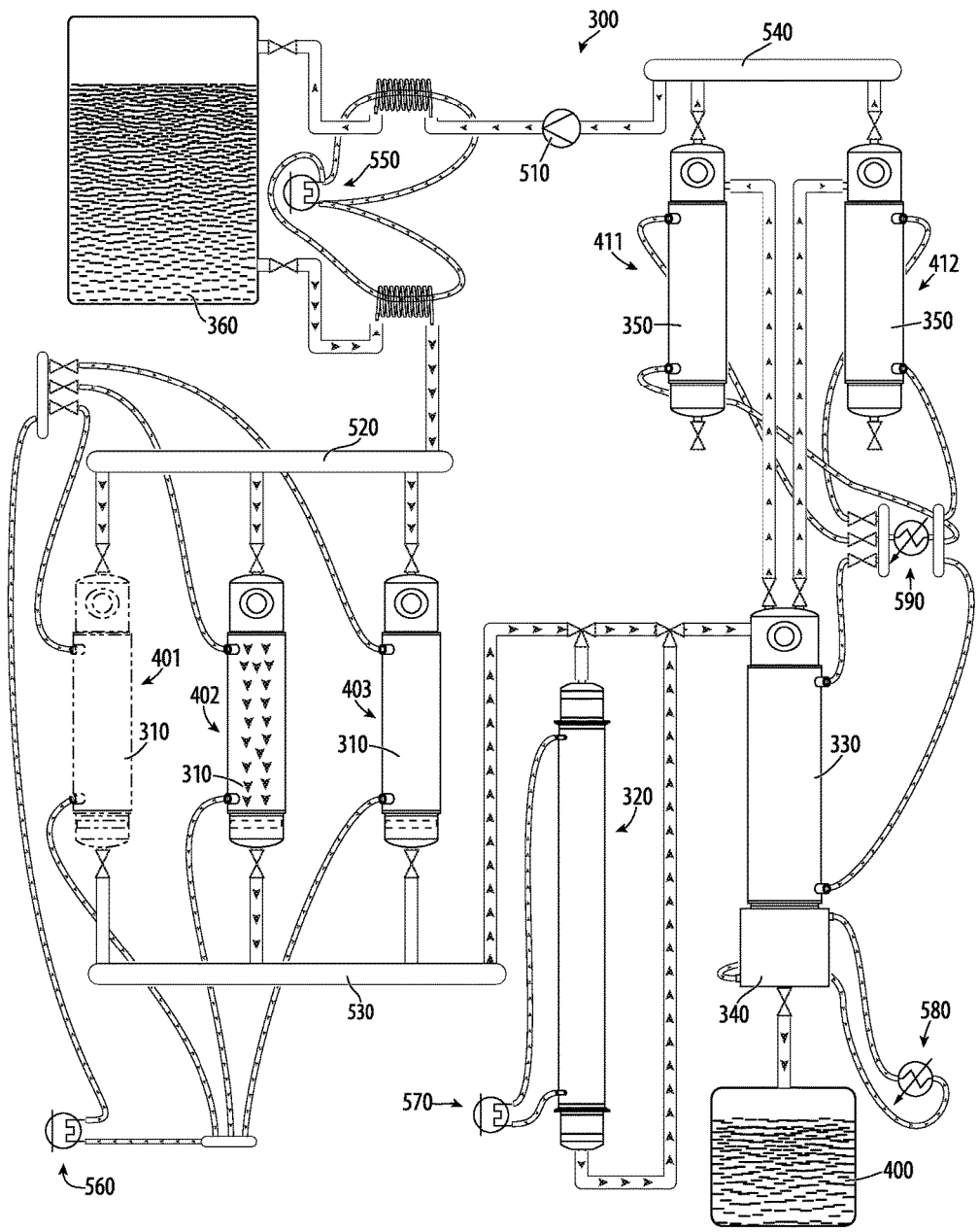
FIG. 13 is a schematic view of a nominal second phase of operation of the continuous-flow extraction system and method embodiment of the invention.

Referring now to FIG. 13, during a nominal second phase of the continuous-flow extraction system and method 300, plant material or biomass contained in a nominal second jacketed extraction vessel 402 undergoes the extraction process, with liquid-phase hydrocarbon solvent passing through the extraction vessel and extracting the desired compound or compounds. A nominal third jacketed extraction vessel 403 has been loaded with fresh biomass, and is ready for the start of the extraction process either before or concurrent with the end of the extraction process in the second jacketed extraction vessel 402. A nominal first jacketed extraction vessel 401 has been removed or has been opened in place for removal of any exhausted biomass, for any necessary cleaning, and for the reloading of fresh biomass.

Figure 14:
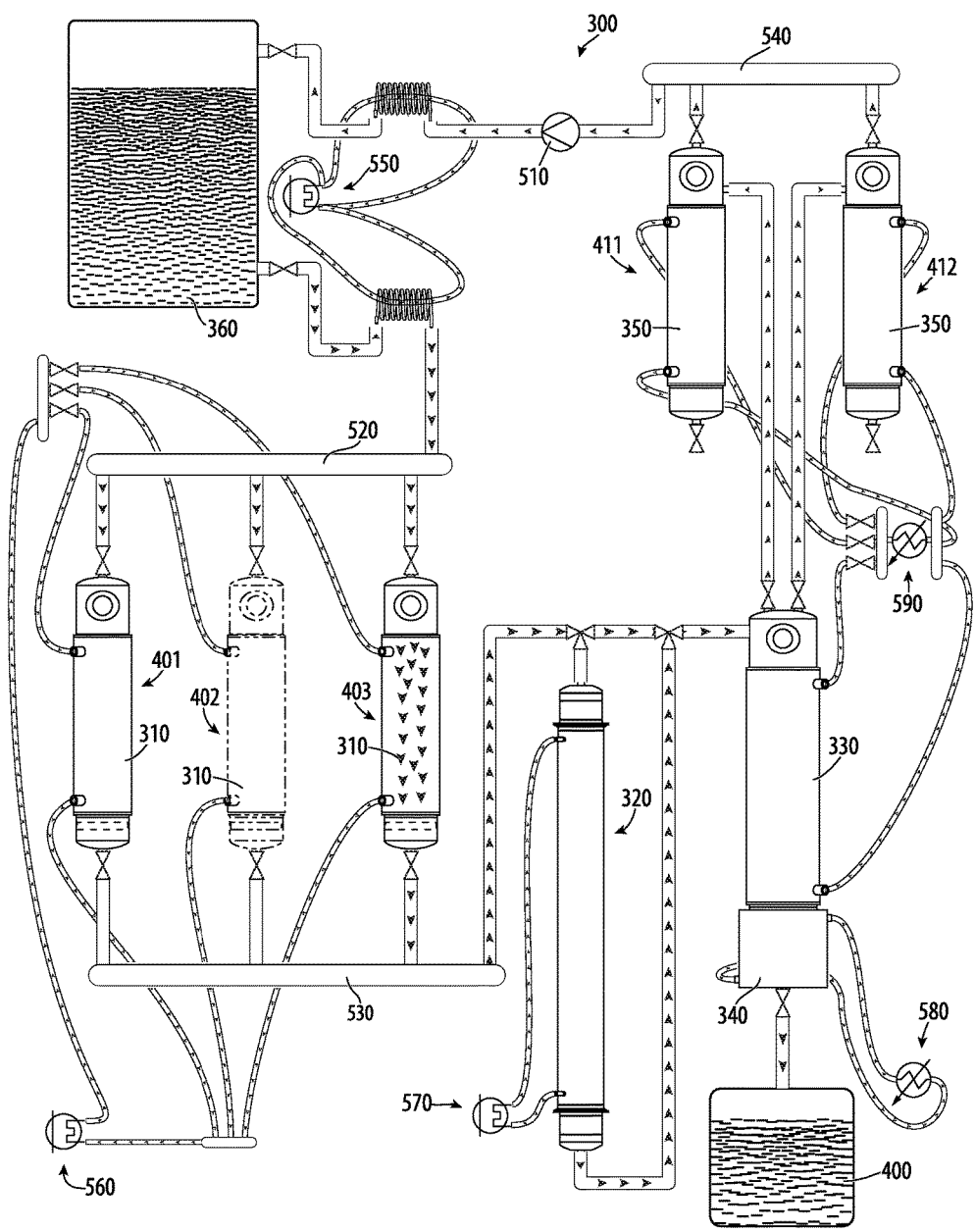
FIG. 14 is a schematic view of a nominal third phase of operation of the continuous-flow extraction system and method embodiment of the invention.

Referring now to FIG. 14, during a nominal third phase of the continuous-flow extraction system and method 300, plant material or biomass contained in a nominal third jacketed extraction vessel 403 undergoes the extraction process, with liquid-phase hydrocarbon solvent passing through the extraction vessel and extracting the desired compound or compounds. A nominal first jacketed extraction vessel 401 has been loaded with fresh biomass, and is ready for the start of the extraction process either before or concurrent with the end of the extraction process in the third jacketed extraction vessel 403. A nominal second jacketed extraction vessel 402 has been removed or has been opened in place for removal of any exhausted biomass, for any necessary cleaning, and for the reloading of fresh biomass.

Because all of the jacketed extraction vessels 310 are essentially identical, additional unmounted vessels can be kept in a ready state and be substituted in for an exhausted vessel in conditions, for instance, where the extraction process runs to exhaustion more quickly than the mounted vessels can be cleaned and reloaded.

Although, because the exhausted biomass must be removed and replaced, the extraction process for any given single jacketed extraction vessel 310 is necessarily a batch process, the continuous-flow extraction system and method 300 provides for a rotating, staggered sequence of extraction using at least two different jacketed extraction vessels 310, and thereby provides a continuous flow to the primary jacketed separator vessel 330, and therefore a continuous flow of desired extract from the jacketed precipitate collector 340 into the precipitated-extract tank 400.

Figure 15:
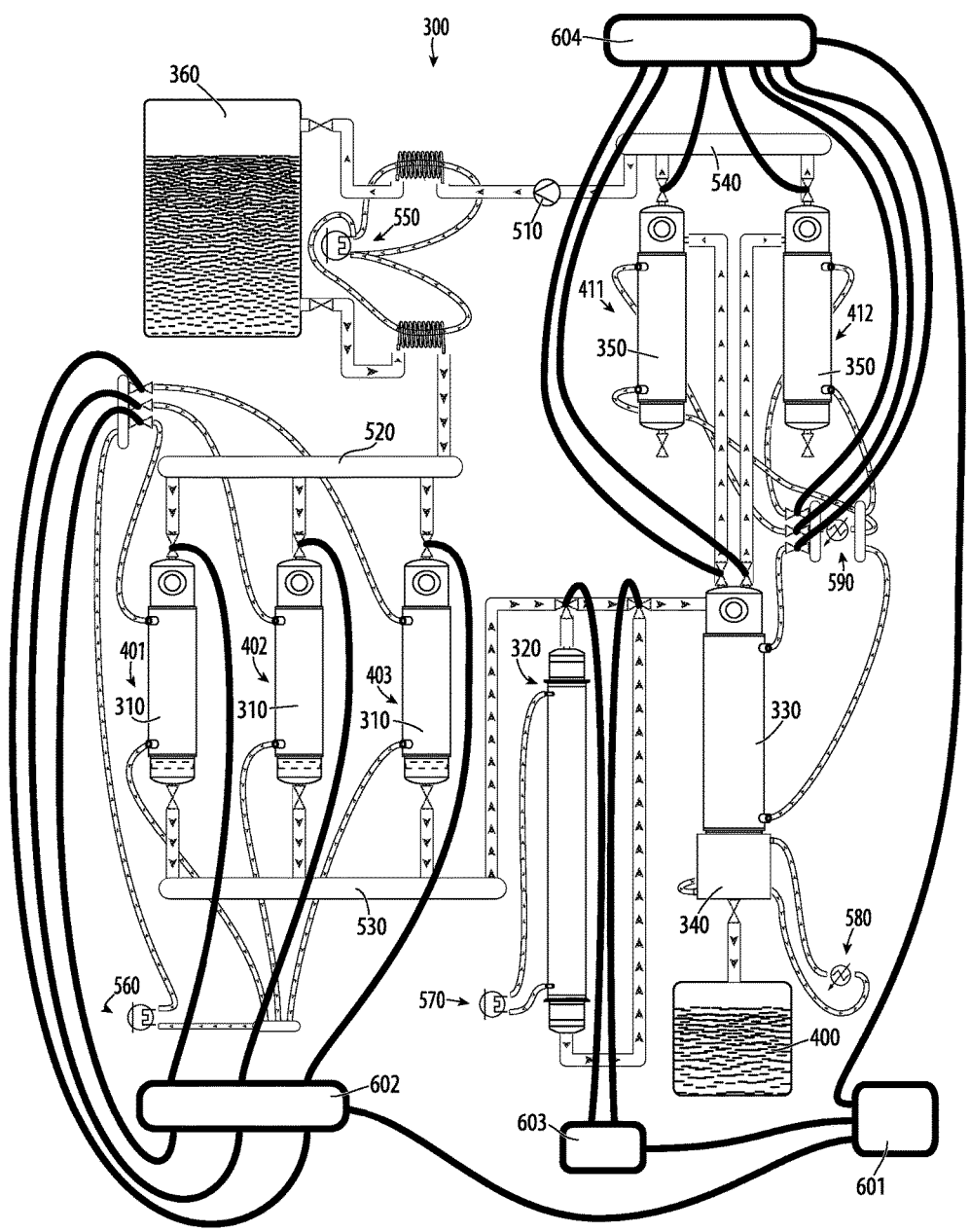
FIG. 15 is a schematic view of the monitoring and control system of the continuous-flow extraction system and method embodiment of the invention.

Referring now to FIG. 15, an embodiment of the continuous-flow extraction system and method 300 provides a system of monitoring and controlling the opening and closing of the several valves controlling the flow of cooling or heating fluid and controlling the flow of the extraction process through various vessels. A main controller 601 exercises overall control of the system, communicating with the subsidiary controllers and facilitating communication among the subsidiary controllers. An extraction-vessel controller 602 coordinates the activation and deactivation of individual jacketed extraction vessels 310, and therefore coordinates the status of any particular vessel for removal or for opening in place for the purposes of unloading, cleaning, and reloading. The extraction-vessel controller 602 opens or closes the valve between the liquid-solvent manifold 520 and the top assembly of any given jacketed extraction vessel 310, and in a coordinated fashion controls the flow of cooling fluid from the extraction chiller 560. The de-waxing controller 603 controls whether raw extract from the raw-extract manifold 530 is routed through the jacketed de-waxing vessel 320 or routed directly to the primary jacketed separator vessel 330. One way of implementing such routing is with two three-way valves, as illustrated. Optionally, where more than one secondary jacketed separator vessel 350 is provided in order to allow periodic downtime for any single vessel without interrupting the continuous flow, a secondary-separator controller 604 can be provided to control the routing of possibly contaminated vapor-phase solvent from the primary jacketed separator vessel 330 to a specific secondary jacketed separator vessel 350, and the coordinated opening or closing of valves regulating the heating fluid circulated through the separator heater 590.

Many further changes and modifications can be made in the present invention without departing from the spirit thereof. I therefore pray that my rights to the present invention be limited only by the scope of the appended claims.

I claim:

1. A continuous-flow extraction system for extracting oil from oil-bearing biomass plant material with a hydrocarbon solvent, comprising:
    (i) a liquid-phase-solvent holding tank adapted to supply solvent in liquid phase for the extraction process;
    (ii) at least two jacketed extraction vessels, each further comprising an extractor body, an extractor top assembly, and an extractor bottom assembly housing an extractor filter unit, each said extraction vessel adapted to contain biomass plant material and a flow of liquid-phase solvent from said liquid-phase solvent holding tank through the biomass for extraction, and each adapted for removal of spent biomass and replacement of fresh biomass;
    (iii) a raw-extract manifold adapted to receive raw extract from said jacketed extraction vessels for downstream distribution;
    (iv) a jacketed de-waxing vessel further comprising a jacketed de-waxer body, a de-waxer jacket upper port and a de-waxer jacket lower port adapted to provide a flowing jacket of chilling fluid, a de-waxer top assembly, and a de-waxer bottom assembly, said jacketed de-waxing vessel adapted to trap and remove unwanted fat and lipid components from a flow of raw extract from said raw-extract manifold;
    (v) a de-waxing chiller adapted to circulate chilling fluid to and from said de-waxer jacket upper port and said de-waxer jacket lower port of said jacketed de-waxing vessel;
    (vi) a separator heater adapted to circulate warming fluid to and from at least one jacketed vessel;
    (vii) a primary jacketed separator vessel having an inlet operationally connected to an outlet of the jacketed de-waxing vessel and adapted to the flash separation of raw extract into solvent in vapor phase and extracted oil in a liquid-phase precipitate, said primary jacketed separator vessel further adapted to receive warming fluid from said separator heater;
    (viii) a jacketed precipitate collector mounted at the bottom of said primary jacketed separator vessel, adapted to collect precipitated extracted oil, said jacketed precipitate collector further adapted to receive warming fluid from a precipitate-collector heater;
    (ix) at least one secondary separator vessel adapted to separate contaminates from the vapor-phase solvent, and to yield a solvent suitable, after liquefaction, for re-use in subsequent iterations of the extraction process;
    (x) a solvent chiller adapted to circulate chilling fluid for the purpose of chilling vapor-phase solvent into a liquid phase at the applicable pressure; and
    (xi) a vapor-pressure pump adapted to draw vapor-phase solvent from said secondary separator vessel and to pump the vapor-phase solvent through a heat exchange with said solvent chiller at increased pressure, causing the solvent to change to liquid phase, and to pump the liquid-phase solvent into said liquid-phase-solvent holding tank for re-use in subsequent iterations of the extraction process.

2. The continuous-flow extraction system of claim 1, wherein said extracted vessels are jacketed, said jacketed extraction vessels further comprising an extractor jacket upper port and an extractor jacket lower port, adapted to provide a flowing jacket of chilling fluid.

3. The continuous-flow extraction system of claim 1, further comprising three said extraction vessels.

4. The continuous-flow extraction system of claim 1, wherein said secondary separator vessels are jacketed.

5. The continuous-flow extraction system of claim 1, further comprising two said secondary jacketed separator vessels.

6. The continuous-flow extraction system of claim 1, where said extractor top assembly further comprises an extractor view port allowing visual confirmation and evaluation.

7. The continuous-flow extraction system of claim 1, where said primary jacketed separator vessel further comprises a view port allowing visual confirmation and evaluation.

8. The continuous-flow extraction system of claim 1, where said secondary separator vessel further comprises a view port allowing visual confirmation and evaluation.

9. The continuous-flow extraction system of claim 1, wherein said jacketed de-waxing vessel is comprised of stainless steel diffuser medium in place of said de-waxer baffle array.

10. The continuous-flow extraction system of claim 1, where use of said jacketed de-waxing vessel can be bypassed when de-waxing is not needed.

11. The continuous-flow extraction system of claim 1, further comprising a system of monitoring and controlling the flow of heating and cooling fluid to individual vessels and the flow of solvent through individual vessels.

12. The continuous-flow extraction system of claim 1, further comprising a system of monitoring and controlling the flow of heating and cooling fluid to individual vessels and the flow of solvent through individual vessels through a main controller, an extraction-vessel controller, a de-waxing controller, and a secondary-separator controller.

13. The continuous-flow extraction system of claim 1, where contaminants separated from the vapor-phase solvent in said secondary separator vessel are collected for further processing.

14. A continuous-flow extraction method for extracting oil from oil-bearing biomass plant material with a hydrocarbon solvent, comprising:
(i) providing a continuous-flow extraction system comprising:
  (a) a liquid-phase solvent holding tank adapted to supply solvent in liquid phase for the extraction process;
  (b) at least two extraction vessels, each further comprising an extractor body, an extractor top assembly, and an extractor bottom assembly housing an extractor filter unit, each said extraction vessel adapted to contain biomass plant material and a flow of liquid-phase solvent from said liquid-phase solvent holding tank through the biomass for extraction, and each adapted for removal of spent biomass and replacement of fresh biomass;
  (c) a chilled jacketed de-waxing vessel further comprising a jacketed de-waxer body, a de-waxer jacket upper port and a de-waxer jacket lower port adapted to provide a flowing jacket of chilling fluid, a de-waxer top assembly, and a de-waxer bottom assembly, said jacketed de-waxing vessel adapted to trap and remove unwanted fat and lipid components from a flow of raw extract from said extraction vessels;
  (d) a de-waxing chiller adapted to circulate chilling fluid to and from said de-waxer jacket upper port and said de-waxer jacket lower port of said jacketed de-waxing vessel;
  (e) a separator heater adapted to circulate warming fluid to and from at least one jacketed vessel;
  (f) a primary jacketed separator vessel having an inlet operationally connected to an outlet of the jacketed de-waxing vessel and adapted to the flash separation of raw extract into solvent in vapor phase and extracted oil in a liquid-phase precipitate, said primary jacketed separator vessel further adapted to receive warming fluid from said separator heater;
  (g) a jacketed precipitate collector mounted at the bottom of said primary jacketed separator vessel, adapted to collect precipitated extracted oil for conveyance to a precipitated-extract container in a continuous flow, said jacketed precipitate collector further adapted to receive warming fluid from a precipitate-collector heater;
  (h) at least one secondary separator vessel adapted to separate contaminates from the vapor-phase solvent, and to yield a solvent suitable, after liquefaction, for re-use in subsequent iterations of the extraction process;
  (i) a solvent chiller adapted to circulate chilling fluid for the purpose of chilling vapor-phase solvent into a liquid phase at the applicable pressure; and
  (j) a vapor-pressure pump adapted to draw vapor-phase solvent from said secondary separator vessel and to pump the vapor-phase solvent through a heat exchange with said solvent chiller at increased pressure, causing the solvent to change to liquid phase, and to pump the liquid-phase solvent into said liquid-phase solvent holding tank for re-use in subsequent iterations of the extraction process; and
(ii) using said continuous-flow extraction system in such a manner that, at any given time, at least one said extraction vessel contains biomass and is undergoing the extraction process, while at least one other said extraction vessel is being cleaned of exhausted biomass and refilled with fresh biomass, maintaining a continuous downstream flow of raw extract.

15. The continuous-flow extraction method of claim 14, further comprising three said extraction vessels.

16. The continuous-flow extraction method of claim 14, further comprising two said secondary separator vessels.

17. The continuous-flow extraction method of claim 14, where said extractor top assembly further comprises an extractor view port allowing visual confirmation and evaluation.

18. The continuous-flow extraction method of claim 14, where said primary jacketed separator vessel further comprises a view port allowing visual confirmation and evaluation.

19. The continuous-flow extraction method of claim 14, where said secondary separator vessel further comprises a view port allowing visual confirmation and evaluation.

20. The continuous-flow extraction method of claim 14, where use of said jacketed de-waxing vessel can be bypassed when de-waxing is not needed.

21. The continuous-flow extraction method of claim 14, wherein said jacketed de-waxing vessel is comprised of stainless steel diffuser medium in place of said de-waxer baffle array.

22. The continuous-flow extraction method of claim 14, further comprising a system of monitoring and controlling the flow of heating and cooling fluid to individual vessels and the flow of solvent through individual vessels.

23. The continuous-flow extraction method of claim 14, further comprising a system of monitoring and controlling the flow of heating and cooling fluid to individual vessels and the flow of solvent through individual vessels through a main controller, an extraction-vessel controller, a de-waxing controller, and a secondary-separator controller.

24. The continuous-flow extraction method of claim 14, where contaminants separated from the vapor-phase solvent in said secondary jacketed separator vessel are collected for further processing.

25. A continuous-flow extraction system for extracting oil from oil-bearing biomass plant material with a hydrocarbon solvent, comprising:
- (i) a liquid-phase-solvent holding tank adapted to supply solvent in liquid phase for the extraction process;
- (ii) a liquid-solvent manifold adapted to receive liquid-phase solvent from said liquid-phase-solvent holding tank for downstream distribution;
- (iii) at least two jacketed extraction vessels, each further comprising a jacketed extractor body, an extractor jacket upper port and an extractor jacket lower port adapted to provide a flowing jacket of chilling fluid, an extractor top assembly, and an extractor bottom assembly housing an extractor filter unit, each said jacketed extraction vessel adapted to contain biomass plant material and a flow of liquid-phase solvent from said liquid-solvent manifold through the biomass for extraction, and each adapted for removal of spent biomass and replacement of fresh biomass;
- (iv) a raw-extract manifold adapted to receive raw extract from said jacketed extraction vessels for downstream distribution;
- (v) an extraction chiller adapted to circulate chilling fluid to and from said extractor jacket upper port and said extractor jacket lower port of each said jacketed extraction vessel;
- (vi) a jacketed de-waxing vessel further comprising a jacketed de-waxer body housing a de-waxer baffle array, a de-waxer jacket upper port and a de-waxer jacket lower port adapted to provide a flowing jacket of chilling fluid, a de-waxer top assembly, and a de-waxer bottom assembly, said jacketed de-waxing vessel adapted to trap and remove unwanted fat and lipid components from a flow of raw extract from said raw-extract manifold;
- (vii) a de-waxing chiller adapted to circulate chilling fluid to and from said de-waxer jacket upper port and said de-waxer jacket lower port of said jacketed de-waxing vessel;
- (viii) a separator heater adapted to circulate warming fluid to and from at least two jacketed vessels;
- (ix) a primary jacketed separator vessel having an inlet operationally connected to an outlet of the jacketed de-waxing vessel and adapted to the flash separation of raw extract into solvent in vapor phase and extracted oil in a liquid-phase precipitate, said primary jacketed separator vessel further adapted to receive warming fluid from said separator heater;
- (x) a jacketed precipitate collector mounted at the bottom of said primary jacketed separator vessel, adapted to collect precipitated extracted oil for conveyance to a precipitated-extract tank in a continuous flow, said jacketed precipitate collector further adapted to receive warming fluid from a precipitate-collector heater;
- (xi) at least one secondary jacketed separator vessel adapted to separate contaminates from the vapor-phase solvent, and to yield a solvent suitable, after liquefaction, for re-use in subsequent iterations of the extraction process;
- (xii) a vapor-solvent manifold adapted to receive vapor-phase solvent from each said secondary jacketed separator vessel;
- (xiii) a solvent chiller adapted to circulate chilling fluid for the purpose of chilling vapor-phase solvent in a liquid phase at the applicable pressure; and
- (xiv) a vapor-pressure pump adapted to draw vapor-phase solvent from said vapor-solvent manifold and to pump the vapor-phase solvent through a heat exchange with said solvent chiller at increased pressure, causing the solvent to change to liquid phase, and to pump the liquid-phase solvent into said liquid-phase-solvent holding tank for re-use in subsequent iterations of the extraction process;

where, in use, at any given time, at least one said jacketed extraction vessel contains biomass and is undergoing the extraction process, while at least one other said jacketed extraction vessel is being cleaned of exhausted biomass and refilled with fresh biomass, maintaining a continuous downstream flow of raw extract.

* * * * *